(12) United States Patent
Wilson et al.

(10) Patent No.: US 9,586,360 B2
(45) Date of Patent: Mar. 7, 2017

(54) PROCESSES FOR MANUFACTURING PERSONAL-CARE APPLICATOR

(71) Applicant: Noxell Corporation, Hunt Valley, MD (US)

(72) Inventors: David Edward Wilson, Reisterstown, MD (US); Gordon Gerald Guay, Joppa, MD (US); Michael Christopher Sabino, Cockeysville, MD (US); David M. Loughney, Phelps, NY (US); Akira Chanthabandith, Henrietta, NY (US); Todd M. Clemons, Canandaigua, NY (US)

(73) Assignee: Noxell Corporation, Hunt Valley, MD (US)

( * ) Notice: Subject to any disclaimer, the term of this patent is extended or adjusted under 35 U.S.C. 154(b) by 0 days.

(21) Appl. No.: 14/752,777

(22) Filed: Jun. 26, 2015

(65) Prior Publication Data

US 2015/0375448 A1    Dec. 31, 2015

Related U.S. Application Data

(60) Provisional application No. 62/017,474, filed on Jun. 26, 2014.

(51) Int. Cl.
*B32B 37/00* (2006.01)
*B29C 65/08* (2006.01)
(Continued)

(52) U.S. Cl.
CPC ............ *B29C 65/08* (2013.01); *A45D 40/265* (2013.01); *B29C 65/74* (2013.01);
(Continued)

(58) Field of Classification Search
CPC ........ B29C 65/08; B29C 65/74; B45D 40/265
(Continued)

(56) References Cited

U.S. PATENT DOCUMENTS 3,447,540 A    6/1969    Osher
4,148,953 A    4/1979    Horton
(Continued)

FOREIGN PATENT DOCUMENTS

DE    10163729    7/2003
DE    202012002332    5/2012
(Continued)

OTHER PUBLICATIONS

U.S. Appl. No. 14/752,694, filed Jun. 26, 2015, David Edward Wilson et al.
(Continued)

*Primary Examiner* — James Sells
(74) *Attorney, Agent, or Firm* — Schwegman Lundberg & Woessner, P.A.

(57) ABSTRACT

A personal-care applicator comprising at least one stem having a longitudinal axis, a proximal end including a handle, and a distal end opposite to the proximal end, and at least a first plurality of bristles ultrasonically welded to the stem and outwardly extending therefrom according to a first pre-determined pattern, wherein the elongated stem and the at least first plurality of bristles comprise ultrasonically compatible materials, and wherein the bristles are ultrasonically bonded to the stem through a direct ultrasonic bond between a surface of the stem and a lengthwise portion of each of the bristles. Process comprises providing a stem strip, wrapping a continuous yarn around a moving endless band, juxtaposing the continuous stem strip with the band's edge, ultrasonically welding the yarn portions adjacent to the band's edge to the stem strip at a predetermined density,
(Continued)

removing the stem strip having the yarn ultrasonically welded thereto from the endless band, and cutting the stem strip into a plurality of applicator components.

24 Claims, 30 Drawing Sheets

(51) Int. Cl.
*A45D 40/26* (2006.01)
*B29C 65/74* (2006.01)
*B29C 65/00* (2006.01)
*B29L 31/00* (2006.01)
*B29L 31/42* (2006.01)
*B29C 65/48* (2006.01)
*B29C 65/56* (2006.01)
*B29C 65/78* (2006.01)
*B29C 65/02* (2006.01)
*B29C 53/78* (2006.01)

(52) U.S. Cl.
CPC ........ *B29C 66/1122* (2013.01); *B29C 66/474* (2013.01); *B29C 66/49* (2013.01); *B29C 66/69* (2013.01); *B29C 66/73921* (2013.01); *B29C 66/81417* (2013.01); *B29C 66/8432* (2013.01); *B29C 53/78* (2013.01); *B29C 65/02* (2013.01); *B29C 65/48* (2013.01); *B29C 65/56* (2013.01); *B29C 65/7891* (2013.01); *B29C 65/7894* (2013.01); *B29C 66/532* (2013.01); *B29C 66/71* (2013.01); *B29C 2793/009* (2013.01); *B29L 2031/42* (2013.01); *B29L 2031/718* (2013.01)

(58) Field of Classification Search
USPC ................ 156/73.1, 73.2, 250, 580.1, 580.2
See application file for complete search history.

(56) References Cited

U.S. PATENT DOCUMENTS

| | | | |
|---|---|---|---|
| RE30,359 E | 8/1980 | Metzler | |
| 4,302,494 A | 11/1981 | Horton | |
| 4,341,231 A | 7/1982 | Costa | |
| 4,346,494 A | 8/1982 | Peabody et al. | |
| 5,159,736 A | 11/1992 | Newell | |
| 5,338,382 A | 8/1994 | Johnson et al. | |
| 5,438,802 A | 8/1995 | Johnson | |
| 5,807,451 A | 9/1998 | Johnson | |
| 5,817,390 A | 10/1998 | Johnson | |
| 5,964,508 A | 10/1999 | Maurer | |
| 6,024,815 A | 2/2000 | Norton | |
| 6,096,151 A * | 8/2000 | Edwards | A46B 3/00 156/173 |
| 6,260,229 B1 | 7/2001 | Edwards et al. | |
| 6,269,514 B1 | 8/2001 | Edwards et al. | |
| 6,351,868 B1 | 3/2002 | Edwards et al. | |
| 6,434,778 B1 | 8/2002 | Edwards et al. | |
| 6,543,083 B1 | 4/2003 | Edwards | |
| 6,638,384 B1 | 10/2003 | Edwards et al. | |
| 6,660,117 B2 * | 12/2003 | Edwards | A46B 5/06 156/173 |
| 6,779,851 B2 | 8/2004 | Bouchiere | |
| 6,988,777 B2 | 1/2006 | Pfenniger | |
| 7,172,006 B2 | 2/2007 | Day et al. | |
| 7,231,926 B2 | 6/2007 | Kim | |
| 7,419,225 B2 | 9/2008 | Fischer et al. | |
| 7,448,693 B2 | 11/2008 | Kwon et al. | |
| 7,503,092 B2 | 3/2009 | Russell | |
| 7,727,350 B2 | 6/2010 | Hawkins et al. | |
| 7,824,513 B2 | 11/2010 | Chernyak et al. | |
| 7,896,995 B2 | 3/2011 | Wylie et al. | |
| 7,930,792 B2 | 4/2011 | Russell | |
| 8,099,820 B2 | 1/2012 | Russell | |
| 8,367,181 B2 | 2/2013 | Chernyak et al. | |
| 8,376,471 B2 * | 2/2013 | Chanthabane | A46D 3/042 300/21 |
| 2003/0094847 A1 | 5/2003 | Shia | |
| 2003/0094848 A1 | 5/2003 | Shia et al. | |
| 2003/0104161 A1 | 6/2003 | Edwards | |
| 2003/0116258 A1 | 6/2003 | Edwards et al. | |
| 2003/0124302 A1 | 7/2003 | Edwards et al. | |
| 2004/0028872 A1 | 2/2004 | Edwards et al. | |
| 2004/0103492 A1 | 6/2004 | Kwon et al. | |
| 2005/0183737 A1 | 8/2005 | Dumler | |
| 2010/0175708 A1 | 7/2010 | Kim | |
| 2011/0146009 A1 | 6/2011 | Marsh et al. | |
| 2012/0006349 A1 | 1/2012 | Iwao | |
| 2012/0233790 A1 | 9/2012 | Uchida et al. | |
| 2013/0236684 A1 | 9/2013 | Loughney et al. | |
| 2013/0291320 A1 | 11/2013 | Kirchhofer et al. | |
| 2015/0374100 A1 * | 12/2015 | Wilson | A45D 40/265 401/129 |
| 2015/0374109 A1 * | 12/2015 | Wilson | A46B 9/025 15/160 |
| 2015/0374110 A1 * | 12/2015 | Wilson | A46B 9/025 15/106 |
| 2015/0374114 A1 * | 12/2015 | Wilson | A46D 1/04 300/21 |
| 2015/0374115 A1 * | 12/2015 | Wilson | A46D 3/00 300/21 |
| 2015/0375448 A1 * | 12/2015 | Wilson | B29C 65/08 156/73.1 |

FOREIGN PATENT DOCUMENTS

| | | |
|---|---|---|
| EP | 1803370 | 7/2007 |
| IN | 2000DN00400 | 4/2001 |
| JP | 2002300921 | 10/2002 |
| JP | 2006116268 | 5/2006 |
| JP | 2006116269 | 5/2006 |
| JP | 2009247585 | 10/2009 |
| JP | 2012045276 | 3/2012 |
| WO | WO2005096909 | 10/2005 |
| WO | WO 2013163502 | 10/2013 |

OTHER PUBLICATIONS

U.S. Appl. No. 14/752,714, filed Jun. 26, 2015, David Edward Wilson et al.
U.S. Appl. No. 14/752,741, filed Jun. 26, 2015, David Edward Wilson et al.
U.S. Appl. No. 14/752,763, filed Jun. 26, 2015, David Edward Wilson et al.
U.S. Appl. No. 14/752,771, filed Jun. 26, 2015, David Edward Wilson et al.
International Search Report with Written Opinion; mail date Oct. 6, 2015; 12 pages.

* cited by examiner

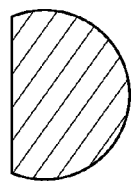 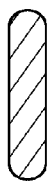 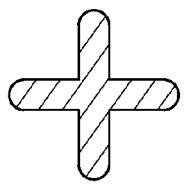 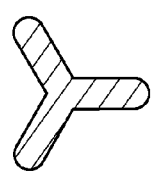 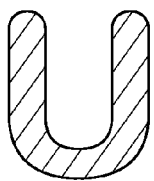
Fig. 29A　　Fig. 29B　　Fig. 29C　　Fig. 29D　　Fig. 29E
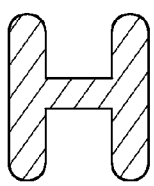 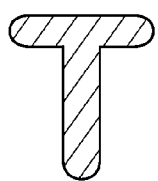  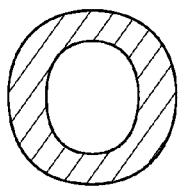 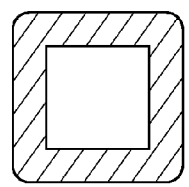
Fig. 29F　　Fig. 29G　　Fig. 29H　　Fig. 29I　　Fig. 29J
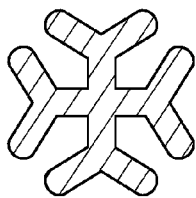 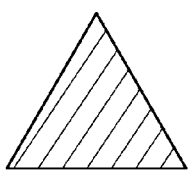 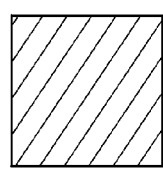 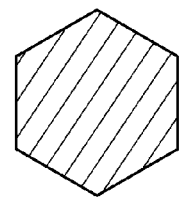
Fig. 29K　　Fig. 29L　　Fig. 29M　　Fig. 29N
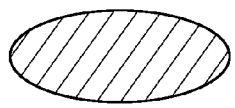 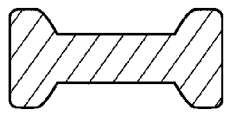 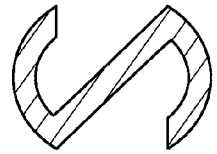
Fig. 29O　　Fig. 29P　　Fig. 29Q
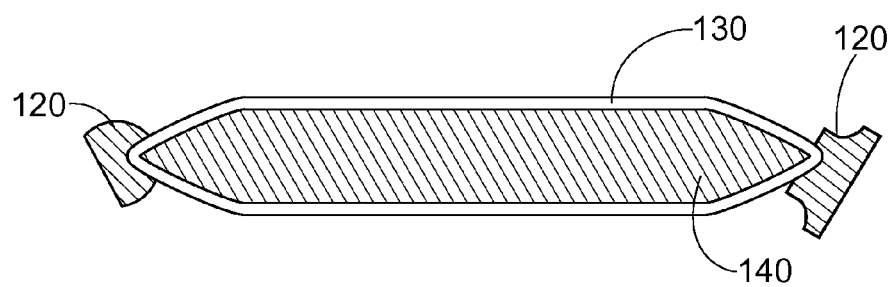
Fig. 30

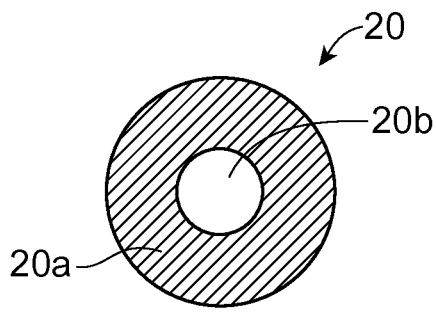
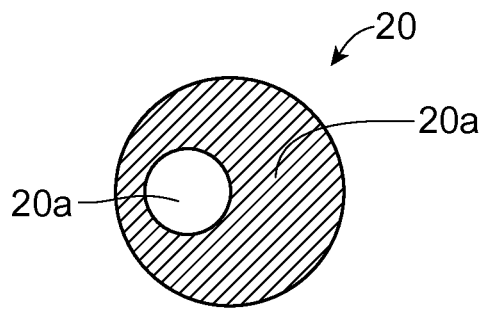
Fig. 32A        Fig. 32B
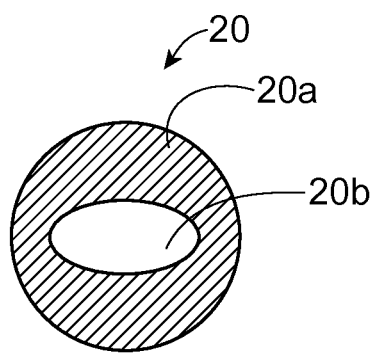
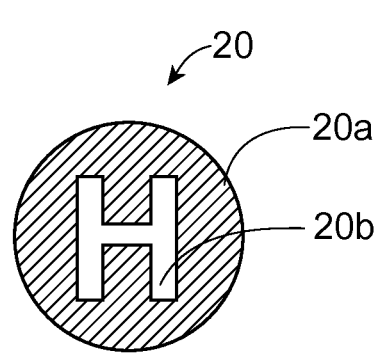
Fig. 32C        Fig. 32D
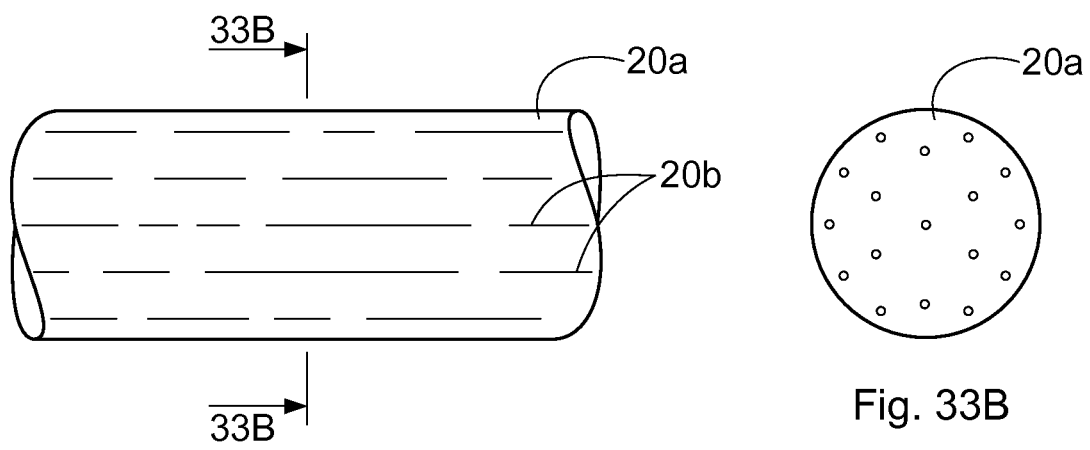
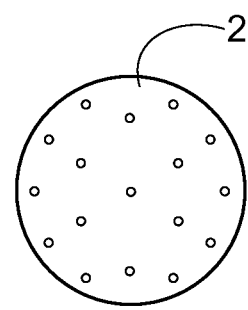
Fig. 33A        Fig. 33B

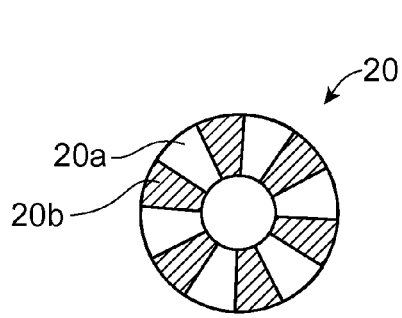
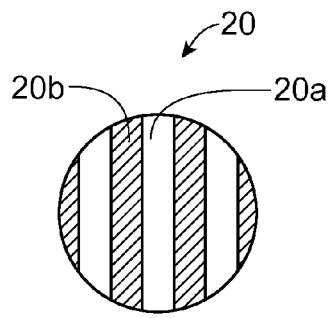
Fig. 34A              Fig. 34B
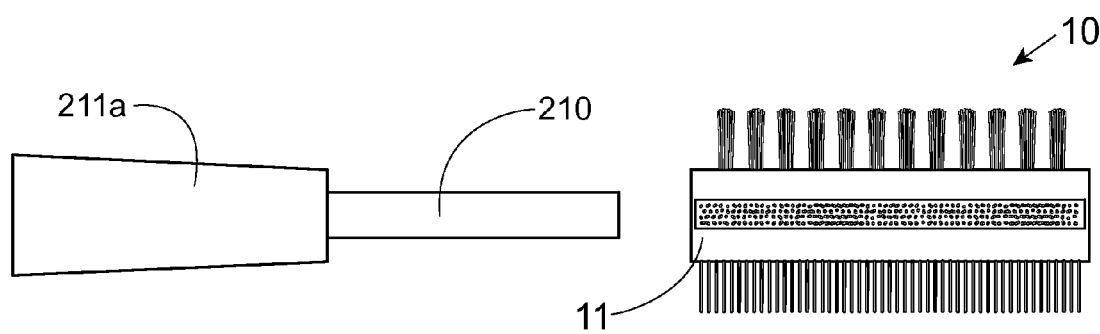
Fig. 35A              Fig. 35B
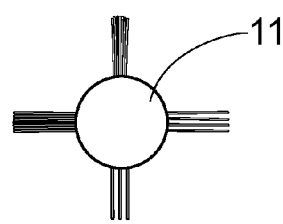
Fig. 35C

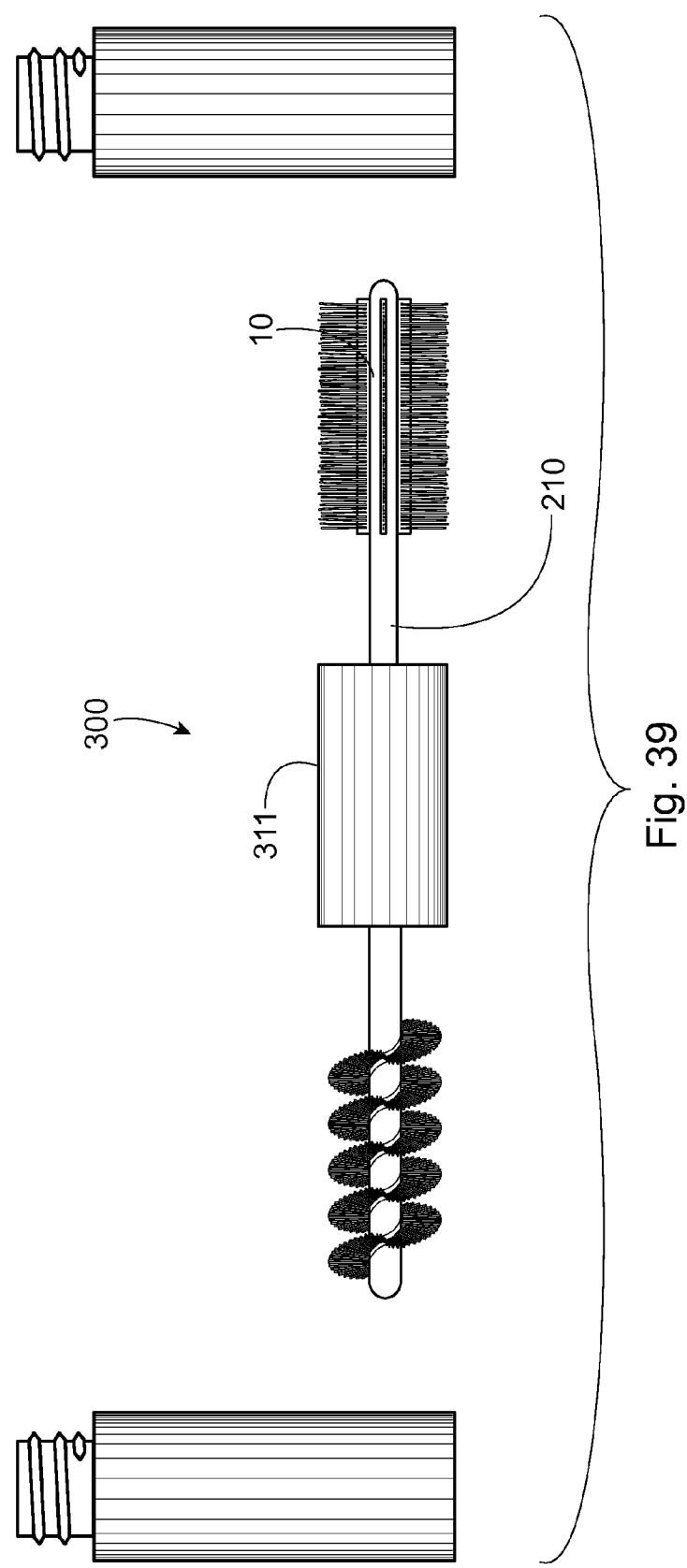

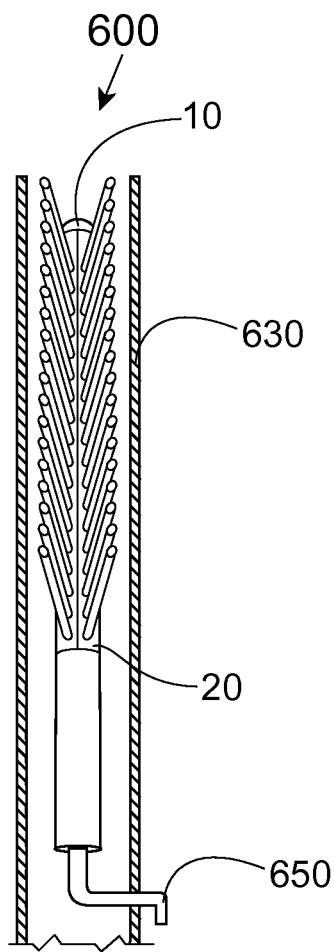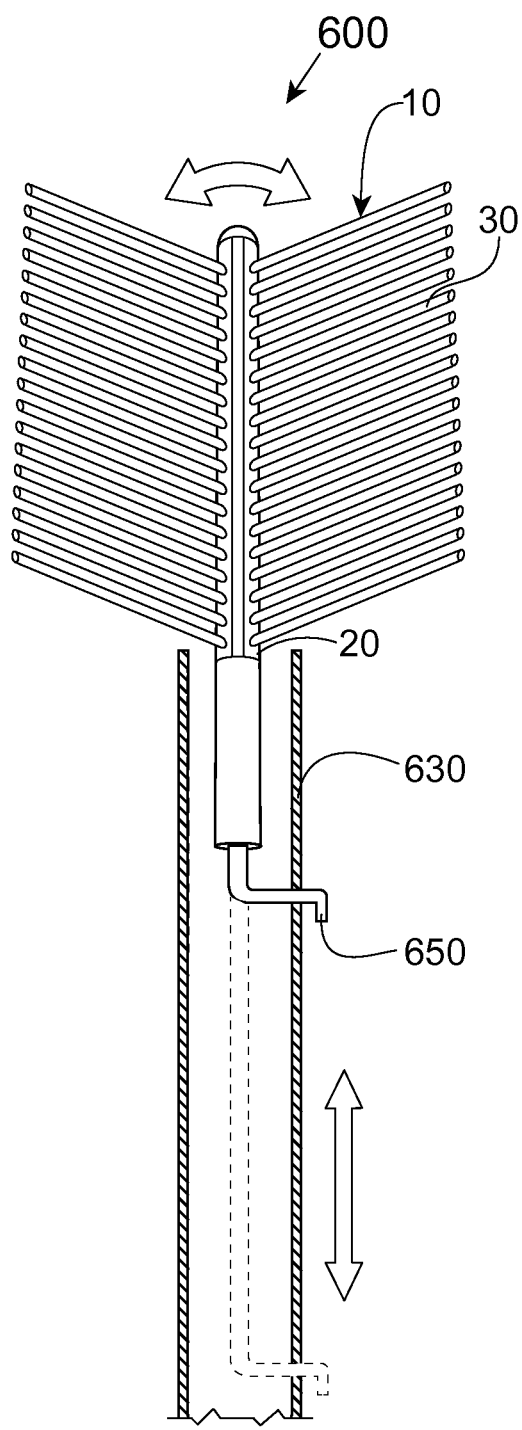
Fig. 42B
Fig. 42C

PROCESSES FOR MANUFACTURING PERSONAL-CARE APPLICATOR

FIELD OF THE INVENTION

The invention is directed to personal-care applicators, such as, e.g., cosmetic applicators. More particularly, the invention pertains to a personal-care applicator in which bristles are attached to a support by ultrasonic welding.

BACKGROUND

Several types of personal-care applicators, such as, e.g., mascara brushes, exist today, including bristled applicators. Examples include, without limitation, twisted-wire brushes, molded brushes, and tufted brushes. Twisted-wire brushes have generally circular fiber patterns. These patterns can be formed or modified by trimming the fibers in post-wiring or post-twisting steps, which can provide various geometric and functional patterns. While a typical process for making twisted-wire brushes provides a manufacturer with an ability, albeit limited, to vary the fiber type and fiber diameter, the variety of available patterns, aside from those achieved by trimming, is generally restricted to essentially circular configurations and specific fiber-density patterns, where abutting bristles must have comparable thickness. Limited choices of fiber-density patterns in the twisted-wire brushes are predicated on the inherent lack of ductility of the wire used to embed the bristles. If, for instance, relatively thick bristles are placed next to relatively thin bristles, the latter may slip though gaps formed in the twisted wire to accommodate the thick bristles (a so-called "tenting" of the wire as it twists).

Manufacturing brushes by molding, such as, e.g., injection molding or casting, allows one to choose almost any desired pattern. But every new brush design would necessarily require a new mold, which makes manufacturing brushes by molding both expensive and difficult to prototype. Molding also typically requires a multi-cycle batch processing, which is time-consuming. In addition, injection molding and casting most typically result in bristle patterns having a continuous taper and/or a mold-parting line throughout the bristle length, to enable the removal of the resulting brush from the mold. The continuous taper may not be desirable in some brush configurations; and the parting line may affect the functionality of the bristles and be otherwise perceived as aesthetically objectionable.

Tufted brushes can be manufactured by a staple and/or process a hot-melt process. These too include certain limitations. A staple process, for example, usually requires processing of identical or similar fibers; hence their selection, volume, and distribution are typically limited by the size of fibers-receiving holes. A hot-melt process, on the other hand, is labor-intense and can adversely impact fiber strength.

In addition, most manufacturing methods that have been utilized to produce cosmetic brushes, including the processes described herein above, typically require a so-called "batch" processing—as opposed to a continuous process. A batch process is typically more expensive and time-consuming than a continuous manufacturing process. Also, it can be more difficult to control the product quality from batch to batch—as compared to a continuous manufacturing process.

Ultrasonic welding of a fibrous material to a backing has been known. For example, anchoring a backing to a yarn pile wrapped around a moving band has been used in manufacturing fibrous articles such as weather-stripping pile products. Several US patents, e.g., describe techniques for making weather-stripping pile articles by ultrasonically welding a yarn to a backing while both the yarn and the backing move along an assembly path: U.S. Pat. No. 4,148,953; U.S. Pat. No. 4,302,494; U.S. Pat. No. 5,338,382; and U.S. Pat. No. 5,807,451. The disclosures of these patents are incorporated herein by reference.

The present disclosure is directed to developing personal-care applicators that would offer manufacturers an ability to generate a greater degree of flexibility in producing new or multiple elements and new and multiple functionalities within the same applicator, allowing, at the same time, the creation of applicators having a wide variety of functional shapes and surfaces. More specifically, the present disclosure is directed, in one aspect, to various personal-care applicators comprising a plurality of bristles ultrasonically welded to a carrier. In another aspect, the present disclosure is directed to various bristled components for cosmetic applicators, in which pluralities of bristles are ultrasonically welded to carriers. In further aspects, the present disclosure is directed to processes for manufacturing said personal-care applicators and bristled components.

SUMMARY OF THE DISCLOSURE

A bristled component for a cosmetic applicator includes at least one longitudinal carrier and a plurality of bristles. The carrier and the bristles comprise ultrasonically compatible materials. The carrier has a longitudinal axis and a length. The bristles are ultrasonically welded to the carrier throughout the carrier's length so that a direct ultrasonic bond is formed between a surface of the carrier and a portion of each of the bristles, such as, e.g., a longitudinal portion of each of the bristles. The bristles outwardly extend from the carrier according to a pre-determined pattern. The bristles can outwardly extend from the carrier at various angles comprising from about −45 degrees to about +45 degrees relative to the carrier's longitudinal axis. In one embodiment, the angles at which the individual bristles extend from the carrier are such that some of the bristles mutually intersect at a distance from the carrier's surface to form a crisscross pattern of the bristles. Such a "web" of the crisscrossed bristles can have beneficial functionality for some cosmetic applications. In a cross-section perpendicular to the carrier's longitudinal axis, the bristles can extend at limitless angles relative to either one of X and Y axes of the conventional X-Y Cartesian coordinate system.

The plurality of bristles can comprise at least a first array of bristles and a second array of bristles. The bristles can have any suitable cross-sectional shapes, including, without limitation, round, rectangular, triangular, polygon, elliptical, solid, hollow, and irregular shapes, and any combination thereof. The bristles can be grouped together to form tufts of bristles. In one embodiment, the first array of bristled comprises a first plurality of tufts and the second array of bristles comprises a second plurality of tufts. In one further embodiment, the first plurality of tufts can be offset relative to the second plurality of tufts along the length of the carrier.

The carrier can have any suitable cross-sectional. Non-limiting examples include cross-sections having round, rectangular, triangular, polygon, elliptical, substantially flat, solid, hollow, and irregular shapes, and any combination thereof. In one embodiment, the elongated carrier has at least one longitudinal slot disposed along a length of the carrier. The array of bristles is ultrasonically welded to the carrier inside the longitudinal slot. The longitudinal slot can have any suitable shape. In one embodiment, the slot is generally V-shaped as viewed in a cross-section perpendicular to the longitudinal axis of the carrier.

The V-shaped slot has a first inner surface and a second inner surface angled relative to the first inner surface, the first and second inner surfaces forming an angle therebetween. In one embodiment, this angle can comprise from about 1 degree to about 179 degrees. In another embodiment, the angle can comprise from about 5 degrees to about 90 degrees. In still another embodiment, the angle can comprise from about 10 degrees to about 45 degrees. In yet another embodiment, the angle can comprise from about 15 degrees to about 30 degrees. The V-shaped slot can be symmetrical or asymmetrical; in the latter instance, the first inner surface of the slot is wider than the second inner surface of the slot.

The first and second inner surfaces of the slot can conveniently provide a welding surface for the bristles to be ultrasonically welded thereto. For example, the first array of bristles can be ultrasonically welded to the first inner surface of the longitudinal slot, while the second array of bristles can be ultrasonically welded to the second inner surface of the slot. The bristles can be welded to the inner surfaces of the slot such that the lengthwise portions of the first array of bristles attached to the first inner surface are substantially parallel to the first inner surface, and the lengthwise portions of the second array of bristles attached to the second inner surface are substantially parallel to the second inner surface of the slot. The lengthwise portions of the bristles being welded, i.e., forming direct ultrasonic bonds with the carrier, can be from about 0.1 mm to about 10 mm.

In an embodiment comprising a plurality of arrays of bristles, the arrays of bristles can extend from the carrier either equidistantly from one another around the carrier's circumference—or otherwise. In one embodiment comprising a plurality of arrays of bristles circumferentially extending from the carrier, the arrays of bristles are disposed around the carrier in a non-random pattern wherein none of the arrays of bristles has a corresponding array of bristles disposed directly opposite thereto, across the carrier, as viewed in its cross-section.

In an embodiment comprising a plurality of arrays of bristles, one array of bristles can differ from another array of bristles with respect to at least one physical parameter, including: a material of bristles, a number of individual bristles, an average length of bristles, a pattern of distribution of bristles, including an average distance between adjacent bristles, an average thickness of the individual bristles, a longitudinal shape of individual bristles, a cross-sectional shape of individual bristles, an average angle of inclination of bristles relative to the carrier, and angles of inclination of individual bristles relative to one another.

In one embodiment, the bristled component can comprise a plurality of carriers, each having its own array or arrays of bristles. In a further embodiment, the bristled component can comprise a core to which the carrier or carriers is/are attached. The core is an elongated element that may have any suitable cross-sectional shape, including, without limitation, round, rectangular, triangular, polygon, elliptical, solid, hollow, and irregular shapes.

The bristled component can be structured and configured to be attached, either permanently or removable, to a stem of the cosmetic applicator. Alternatively, the bristled component can be designed to comprise the stem of the applicator, wherein the carrier or the core forms the stem of the applicator. Removable attachment allows a manufacturer or a consumer to remove the bristled component without damaging the applicator. This can be done, e.g., to clean or modify the bristled component, or to replace one bristled component with another.

A continuous process for manufacturing a bristled component or components for a personal-care applicator comprises: wrapping at least a first continuous strand of material around a moving endless band having a top side, a backside, and at least a first edge therebetween, thereby causing the at least first continuous strand of material to contact the at least first edge of the band at a predetermined density; juxtaposing at least a first support strip with the at least first edge of the band thereby causing the at least first support strip to contact the at least first strand of material disposed at the first edge of the band, the at least first strand of material and the at least first support strip comprising ultrasonically compatible materials; ultrasonically welding lengthwise portions of the first strand of material adjacent to the first edge to the first support strip at the predetermined density and such that said lengthwise portions of the first strand of material become ultrasonically bonded to the first support strip through a direct ultrasonic bond between a surface of the first support strip and surfaces of said lengthwise portions of the first strand of material, thereby forming at least a first continuous bristled strip comprising the first support strip and a plurality of first-strand bristles ultrasonically welded thereto and outwardly extending therefrom; removing the at least first continuous bristled strip from the endless band; and cutting the at least first continuous bristled strip into a plurality of bristled components. The predetermined density, at which the at least first continuous strand of material contacts the at least first edge, may vary—depending on the application and the desired pattern of bristles of the bristled component being made.

The process can also include a step of splitting the at least first strand of material to form a plurality of free ends thereof. The process can further include a step of modifying at least one physical characteristic of the plurality of first-strand bristles. Such a modification may comprise a treatment selected from the group consisting of trimming, coating, mechanical treatment, temperature treatment, chemical treatment, radiation treatment, modification of surface energy, change of shape, change of color, and change of angular orientation.

The process may also include a step of modifying the at least first support strip by subjecting the at least first support strip to a treatment selected from the group consisting of trimming, coating, temperature treatment, mechanical treatment, chemical treatment, radiation treatment, modification of surface energy, change of shape, and change of color.

In one embodiment of the process, there are two support strips are used, so that the step of juxtaposing at least a first support strip with the at least first edge of the band comprises juxtaposing a second support strip with a second edge of the band, the second edge being opposite to the first edge. This allows one to conduct ultrasonic welding simultaneously and in parallel at two mutually opposite edges of the band.

More than one strands of material, either identical or different, can be used in the process. In one embodiment, the step of wrapping at least a first strand of material around a continuously moving endless band comprises wrapping at least a second strand of material around the continuously moving endless band. One skilled in the art would readily understand that "at least one . . . " and/or "at least two . . . " includes one, two, three, four, five, and so on, elements, depending on the application and the design of the bristled component being made. Thus, the use of more than two strands of material is contemplated by the present disclosure. The multiple strands of material may differ from one another in at least one property of physical characteristic. Those may include, without limitation, chemical composition, thickness, cross-sectional shape, surface energy, elasticity, rigidity, and color of the strands of material.

In one embodiment of the process, involving more than one strand of material being wrapped around the moving band, multiple strands can be wrapped around the band at multiple densities. For example, one (or more) strands of material can be wrapped around the band at a first density while another (or other) strand(s) of material can be wrapped around the band at a second density, wherein the first density is different from the second density. Also, multiple strands of material can be wrapped to alternate, in any fashion, relative to one another at the edge or edges of the band.

In one embodiment, wrapping at least a first strand of material around a continuously moving endless band comprises causing the at least first strand of material to form a pattern wherein portions of the first strand of material disposed on the top side of the band form an acute angle relative to a direction in which the band is traveling. In a further embodiment, involving multiple strands of material being wrapped around the band, the at least first strand of material can be wrapped to form a pattern wherein portions of the first strand of material disposed on the top side of the band form a first angle relative to a direction in which the band is traveling, while the at least second strand of material can be wrapped to form a pattern wherein portions of the second strand of material disposed on the top side of the band form a second angle relative to the direction in which the band is traveling, wherein the first angle is different from the second angle.

The process can include a step of manufacturing the support strip or strips. Any method known in the art can be used, e.g., molding, stamping, 3D printing, milling, extrusion, pultrusion, and any combination thereof. As one skilled in the art will recognize, the term "pultrusion" refers to a continuous process for manufacturing composite materials with constant cross-section.

In a related aspect, the disclosure is directed to a cosmetic applicator comprising the bristled component as described herein. For example, a cosmetic applicator can comprise at least one stem having a proximal end including a handle and a distal end opposite to the proximal end. The bristled component can be attached, either permanently or removably, to the stem. Alternatively, the stem itself can be formed from the carrier of the bristled component.

The bristled component can be attached to the proximal end of the stem, either essentially in parallel to the stem or in an angled position relative to the stem. Alternatively, the bristled component can be attached to the stem lengthwise between the proximal and distal ends of the stem. In the latter instance, the bristled component can be attached substantially parallel to the stem. In one embodiment, the bristled component can be permanently affixed to the stem. In another embodiment, the bristled component can be removably attached to the stem, so that one would be able to easily replace one bristled component with another. This can be accomplished, for example, by a slidable attachment. Such an attachment can comprise, e.g., configured slots of the stem and mating protrusion of the bristled component.

Alternatively to being parallel to the stem, the bristled component can be attached to the stem to comprise a substantially helical coil spiraling around the stem's longitudinal axis. This can be accomplished by placing the bristled component in a desired configuration around the stem that is otherwise not twisted—and attaching, either permanently or removably, the so placed bristled component to the stem. Alternatively or additionally, the bristled component can be attached to the stem substantially parallel to the stem's longitudinal axis—and then the stem, having the attached bristled component, can be twisted around its own longitudinal axis until the bristled component acquires a desired shape.

Embodiments are contemplated in which a plurality of bristled components can be attached to the stem, either permanently or removably. Two or more bristled components can be attached to the stem either simultaneously or in place of one another. In these and other embodiments, one or several bristled component can be selected from the group consisting of a component for heavy-loading mascara application, a component for increased-volume mascara application, a component for lift-and-curl mascara application, a component for lash-separation mascara application, and any combination thereof. Likewise, the bristled or portions (arrays) of bristles can differs from one another in at least one physical parameter selected from the group consisting of material, length, thickness, shape, elasticity, stiffness, rigidity, color, angles of inclination, and pattern of distribution of bristles in the row, including density and distances between adjacent bristles.

In one beneficial embodiment of the applicator, a single bristled component or a plurality of bristled components can be structured and configured to at least partially fold into the stem and to unfold from the stem. In such an embodiment, the stem can be designed to be at least partially hollow—to provide a space for housing the bristled component or components in the folding configuration. In this embodiment, the bristled component can have, e.g., one or more living hinges allowing the folding of the component.

An embodiment is contemplated in which the personal-care applicator comprises two stems attached to the handle at both sides thereof so that the handle is disposed intermediate the distal ends of the two stems. In such an embodiment of the applicator, the two stems consist of a first stem and a second stem substantially parallel to the first stem. The first stem has a first array of bristles attached thereto and the second stem has a second array of bristles attached thereto. The bristles of the first array differ from the bristles of the second array in at least one characteristic selected from the group consisting of pattern of distribution of the bristles on the stem, bristle material, length, thickness, shape, specific gravity, rigidity, stiffness, flexibility elasticity, color, and angle of inclination relative to the stem. Such a configuration may provide a convenient combination of what would otherwise be essentially two separate applicators, each having its own bristle design and offering its own functionality or functionalities, as described herein. In a further embodiment comprising two parallel stems, one of the stems can carry a conventional applicator, comprising, e.g., a twisted-wire brush or a molded brush.

A process for manufacturing a personal-care applicator comprising: providing at least a first elongated stem having a proximal end and a distal end, providing at least one bristled component as described herein, and attaching the at least first bristled component to the at least first stem. The process may also include a step of manufacturing the at least first elongated stem from a plastic material using a technique selected from the group consisting of molding, stamping, 3D printing, milling, extrusion, pultrusion, and any combination thereof. Steps involved in the making of the bristled components are described herein, in the context of the process for making the bristled component.

In one embodiment, the step of attaching the at least first bristled component to the at least first stem comprises affixing the first component to the distal end of the stem such that the first bristled component is substantially parallel to the first stem. In an alternative embodiment, attaching the at least first bristled component to the at least first stem comprises affixing the first bristled component to the distal end of the stem such that the first bristled component is angled relative to the first stem.

In a further embodiment, the at least first bristled component can be affixed to the at least first stem lengthwise between the proximal and distal ends of the first stem. In such a configuration, the at least first bristled component can be disposed substantially parallel to the first stem. In a further step, if desired, the first bristled component and the stem can be twisted around a longitudinal axis of the stem—to cause the first bristled component attached to the first stem to adapt a substantially helical shape. Alternatively, attaching the at least first bristled component to the at least first stem in a helical pattern can be accomplished by adjusting the shape of the bristled component—and without twisting the stem.

In another aspect, this disclosure is directed to a personal-care applicator in which the stem itself comprises a support carrier to which a plurality of bristles is ultrasonically welded. This applicator comprises at least one stem having a longitudinal axis, a proximal end including a handle, and a distal end opposite to the proximal end, and at least a first plurality of bristles ultrasonically welded to the stem and outwardly extending therefrom according to a first predetermined pattern, wherein the elongated stem and the at least first plurality of bristles comprise ultrasonically compatible materials, and wherein the bristles are ultrasonically bonded to the stem through a direct ultrasonic bond between a surface of the stem and a lengthwise portion of each of the bristles.

A continuous process for manufacturing this personal-care applicator comprises providing at least a first stem strip having a longitudinal axis; wrapping at least a first continuous strand of material around a moving endless band having a top side, a backside, and at least a first edge therebetween, thereby causing the first continuous strand of material to abut the first edge at a predetermined density; juxtaposing the first stem strip with the first edge of the band having the first continuous strand of material in contact with the first edge, the first continuous strand of material and the first stem strip comprising ultrasonically compatible materials; ultrasonically welding lengthwise portions of the first continuous strand of material adjacent to the first edge to the first stem strip at the predetermined density and such that said lengthwise portions of the first continuous strand of material become ultrasonically bonded to the first stem strip through a direct ultrasonic bond between a surface of the first stem strip and surfaces of said lengthwise portions of the first continuous strand of material, thereby forming a plurality of first-strand bristles ultrasonically welded to the first stem strip; removing the first stem strip having the plurality of first-strand bristles ultrasonically welded thereto from the endless band; and cutting the first stem strip having the plurality of first-strand bristles ultrasonically welded thereto into a plurality of applicator components, each comprising a stem having a proximal end, a distal end opposite to the proximal end, and an array of bristles ultrasonically welded to the stem between the proximal and distal ends. The stem strip can be manufactured from a plastic material using any suitable technique, including, without limitation, molding, stamping, 3D-printing, milling, extrusion, pultrusion, and any combination thereof.

BRIEF DESCRIPTION OF THE DRAWINGS

The embodiments set forth in the drawings are illustrative and exemplary in nature—and are not intended to limit the subject matter defined by the claims. The detailed description of the illustrative embodiments can be understood when read in conjunction with the drawings, where like structures are indicated with like reference numerals.

FIGS. 29A-29Q schematically show several non-limiting exemplary embodiments of the cross-sectional profile of the longitudinal carrier.

FIG. 30 schematically shows a fragment of the process and illustrates an exemplary cross-sectional angled position of the support strips relative to the band.

FIGS. 32A-32D schematically show several exemplary embodiments, in cross-sections, of a carrier comprising sheath-core bi-component structures.

FIGS. 33A and 33B schematically show a side view and a cross-section of an exemplary embodiment of a carrier comprising a matrix-fibril structure.

FIG. 34A schematically shows, in a cross-section, an exemplary embodiment of a carrier comprising a "hollow-pie wedge" structure.

FIG. 34B schematically shows, in a cross-section, an exemplary embodiment of a carrier comprising a "conjugate-pie wedge" structure.

FIG. 35A-35C schematically show a fragment of an exemplary process for making a personal-care applicator, wherein a plurality of bristled components can be affixed to a central core component that can then be attached to a stem.

FIG. 39 schematically shows an exemplary embodiment of a dual-brush applicator.

FIGS. 42A-42C schematically show an exemplary embodiment of an applicator having a folding brush.

DETAILED DESCRIPTION

Figure 1A:
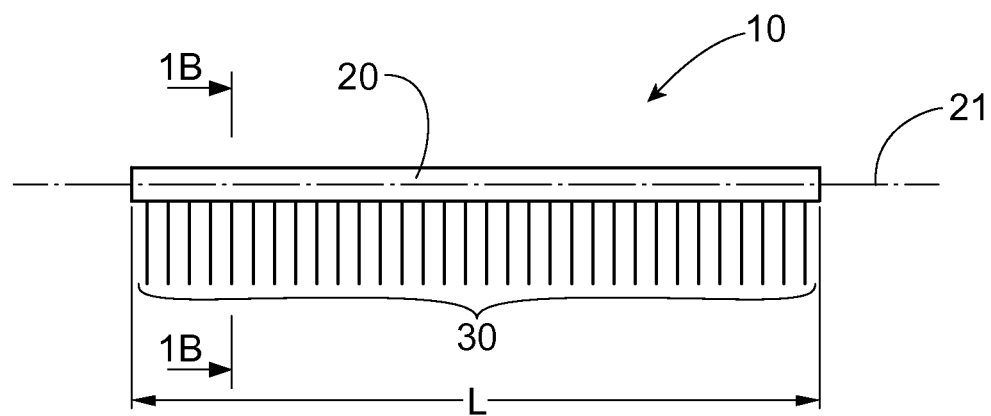
FIG. 1A schematically shows a side view of an exemplary embodiment of a bristled component according to the disclosure.
Figure 1B:
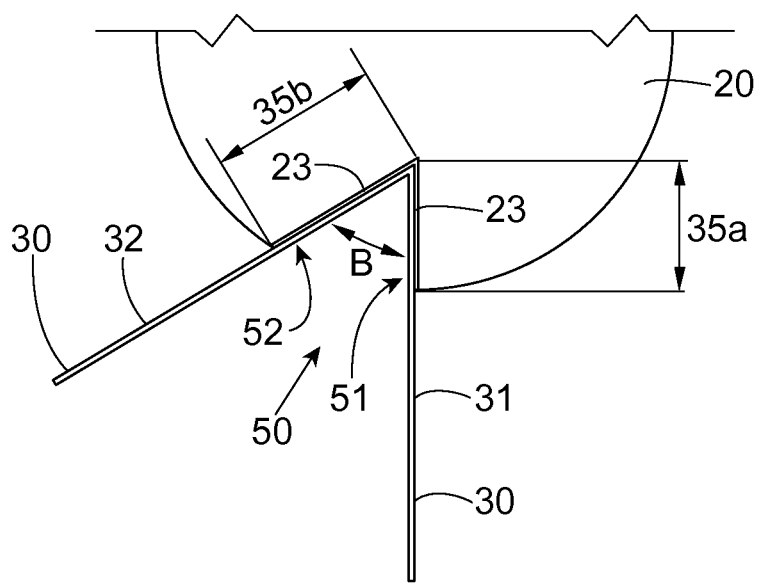
FIG. 1B schematically shows a cross-sectional view of the embodiment shown in FIG. 1A and taken along lines B-B.
Figure 2:
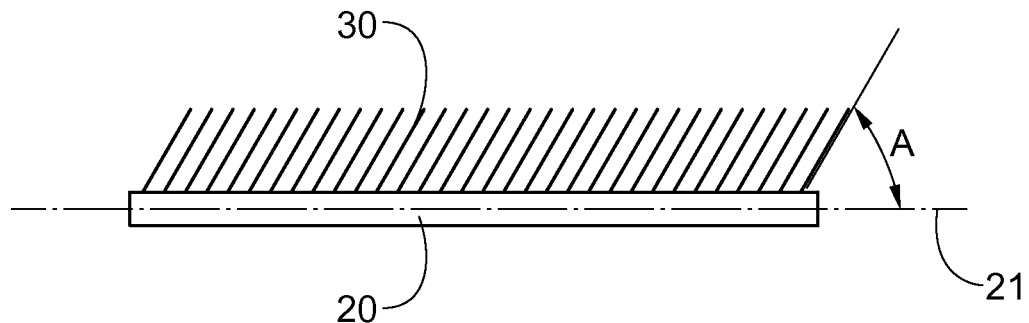
FIG. 2 schematically shows a side view of an exemplary embodiment of a bristled component in which bristles are inclined relative to a longitudinal axis of a carrier.
Figure 3:
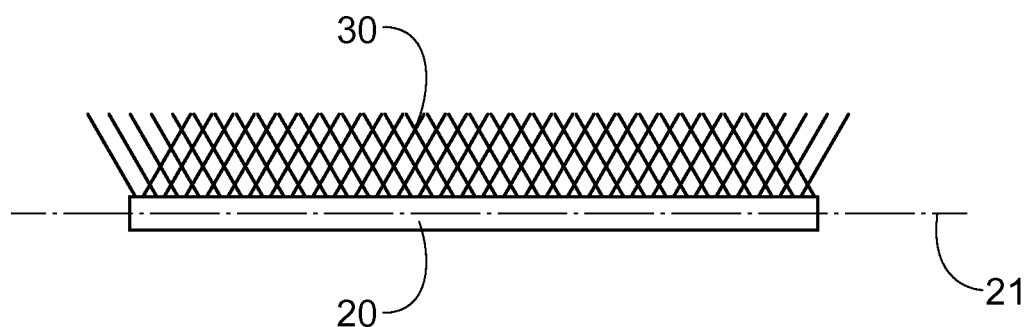
FIG. 3 schematically shows a side view of an exemplary embodiment of a bristled component in which bristles have differential angles of inclination relative to a longitudinal carrier.

As is shown in FIGS. 1-3, a bristled component 10 for a cosmetic applicator includes a longitudinal carrier 20 and a plurality of bristles 30. The carrier 20 and the bristles 30 comprise ultrasonically compatible materials. Such ultrasonically compatible materials may include, e.g., nylon and polypropylene. The longitudinal carrier 20 has a longitudinal axis 21, a length L, and a cross-section of any suitable shape. Non-limiting examples of the carrier's cross-sectional shape include round, rectangular, triangular, polygon, and elliptical shapes. The carrier 20 may have an irregular shape. The carrier 20 may also comprise a flat, solid, or hollow structure. FIGS. 29A-29Q show several non-limiting exemplary embodiments of the cross-sectional profile of the longitudinal carrier 20. The carrier 20 can be made by any method known in the art, such as, e.g., molding, stamping, 3D printing, milling, extrusion, pultrusion, and any combination thereof.

The carrier 20 may comprise a uniform, single-material structure. Alternatively, the carrier 20 may comprise a multi-material structure, wherein at least one of the materials is ultrasonically wieldable. For example, the carrier 20 may comprise a side-by-side bi-component structure (FIGS. 31A-31G), wherein one of the materials (20a, 20b) is ultrasonically wieldable. Alternatively, the carrier 20 may comprise a so-called sheath-core structure (FIGS. 32A and 32B), wherein at least the sheath 20a comprises an ultrasonically wieldable material. Such a sheath-core carrier 20, wherein one of the components (a core 20b) is fully surrounded by another component (a sheath 20a), can be beneficial when it is desirable to provide a core that contributes to the overall strength of the carrier 20, while the sheath 20a enables carrier to be ultrasonically wielded to the bristles.

Another type of the multi-component structure that may be used in construction of the carrier 20 is a so-called matrix-fibril, or island-in-the-sea, bi-component structure, FIGS. 33A and 33B. In such a carrier, there are non-continuous areas of one material ("fibrils" or "islands") 20b disposed in a matrix of another material ("sea") 20a. The "islands" 20b can comprise a melt-spinnable polymer such as, e.g., nylon, polyester, or polypropylene; and polystyrene water-soluble polyesters and plasticized or saponified polyvinyl alcohol can form the sea or matrix 20a. Segmented pie structures, comprising alternating portions of two or more materials, can be also used as carrier 20, FIGS. 34A and 34B. In such a carrier, portions of alternating materials 20a, 20b can be made, e.g., of nylon and polyester. In FIG. 34A, the carrier 20 comprises a so-called "hollow-pie wedge"; and in FIG. 34B, the carrier 20 comprises a so-called "conjugate-pie wedge."

Since the carrier 20 and the bristles 30 comprise ultrasonically compatible materials, the bristles 30 can be ultrasonically welded to the carrier 20 to form a predetermined pattern of distribution throughout the carrier's length L or any portion thereof. As a result of the ultrasonic welding, a direct bond 23 can be formed between a surface of the carrier 20 and lengthwise portions 35 of the bristles 30. The bristles 30, ultrasonically welded to the carrier 20, can outwardly extend from the carrier 20 according to a predetermined pattern. Such a predetermined pattern can be based on the desired properties of the bristled component 10, as will be discussed herein.

For example, the bristles 30 can extend from the carrier at various angles comprising from about −45 degrees to about +45 degrees relative to the carrier's longitudinal axis 21. All bristles 30 can have a common angle of inclination A relative to the axis 21. Alternatively, the bristles 30 may have differential angles of inclination relative to the axis 21. In the embodiment of FIG. 2, for example, all bristles 30 are inclined relative to the axis 21 at approximately the same angle A. In the embodiment of FIG. 3, the angles of inclination relative to the carrier 20 differ among the bristles 30, and the angles at which the individual bristles 30 extend from the carrier are such that some of the bristles 30 mutually intersect to form crisscross patterns therebetween. Bristles 30 may differ from one another in at least one physical characteristic selected from the group consisting of material, length, thickness, shape, cross-sectional structure or geometry (e.g., solid or hollow), specific gravity, and angle of inclination relative to the carrier.

Figure 4A:
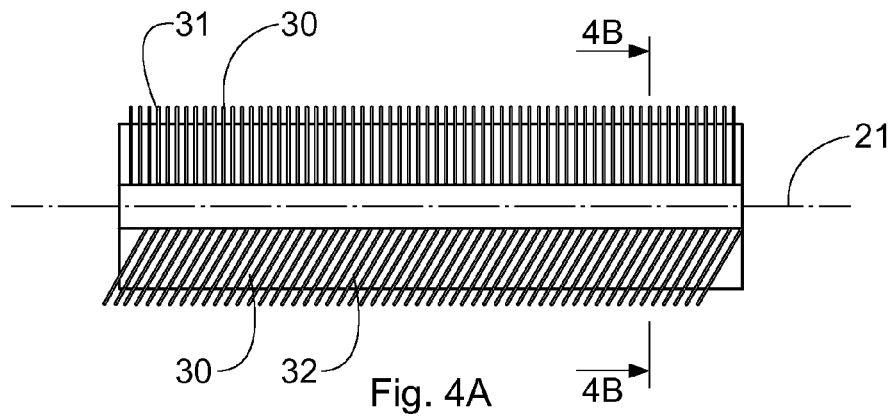
FIG. 4A schematically shows a side view of an exemplary embodiment of a bristled component having two parallel arrays of bristles.
Figure 4B:
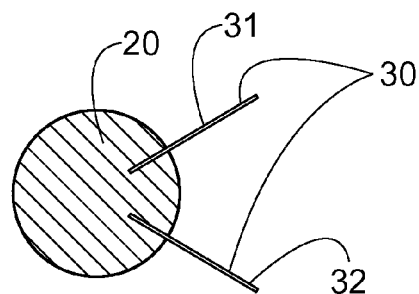
FIG. 4B schematically shows a cross-sectional view of the embodiment shown in FIG. 4A and taken along lines B-B.
Figure 5A:
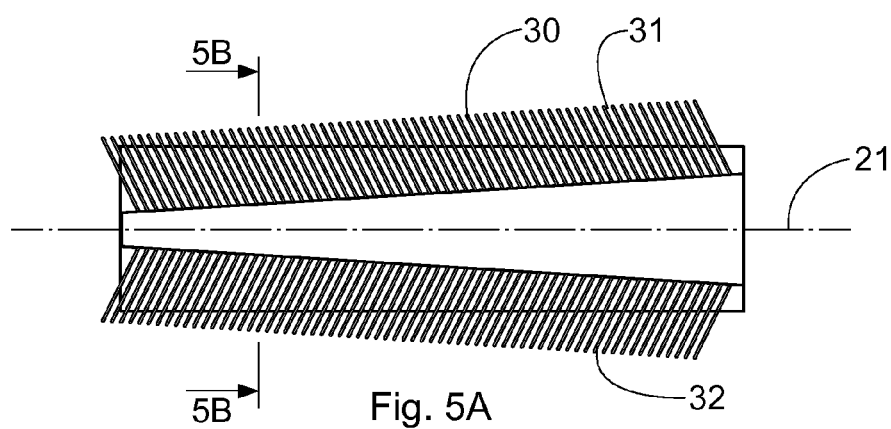
FIG. 5A schematically shows a side view of an exemplary embodiment of a bristled component having two non-parallel arrays of bristles.
Figure 5B:
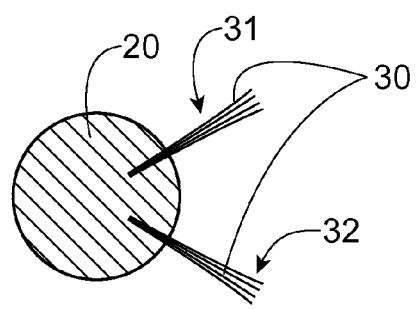
FIG. 5B schematically shows a cross-sectional view of the embodiment shown in FIG. 5A and taken along lines B-B.

As is shown in FIGS. 4A-5B, the plurality of bristles 30 can comprise at least a first array or row of bristles 31 and a second array or row of bristles 32. These arrays of bristles 31 and 32 may be disposed substantially parallel to one another (FIGS. 4A and 4B). Alternatively, the arrays of bristles 31, 32 may be disposed to be not parallel to one another (FIGS. 5A and 5B). Within each of the arrays of bristles, the individual bristles, too, may be parallel to one another—or, alternatively, may not be parallel to one another.

Figure 9:
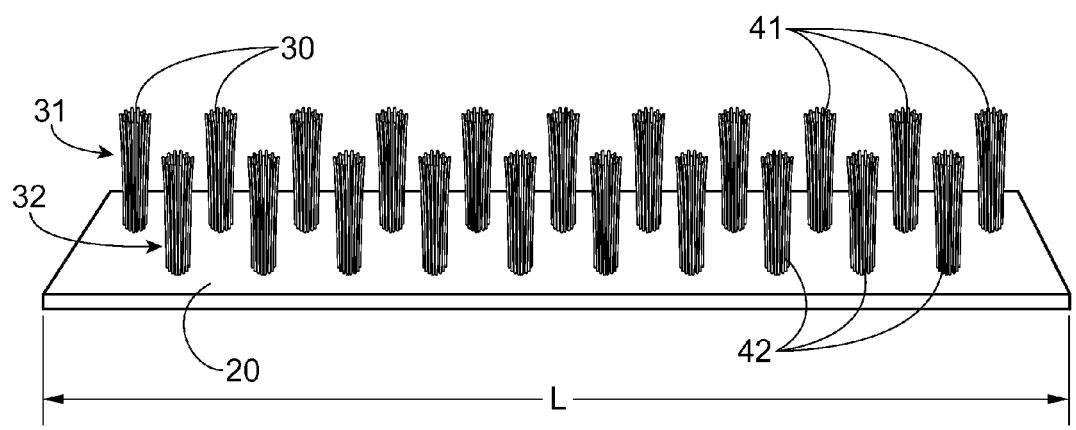
FIG. 9 schematically shows an exemplary embodiment of the bristled component having two arrays of bristles, each comprising a plurality of tufts, wherein the tufts of one of the arrays of bristles is offset relative to the tufts of the other array of bristles.
Figure 10A:
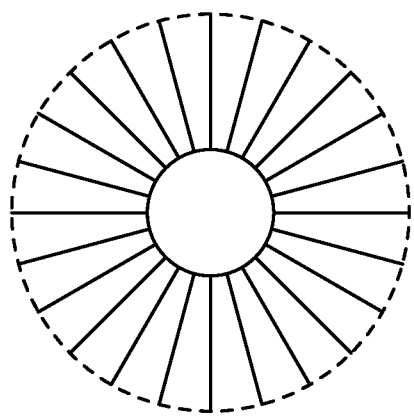
FIGS. 10A-10M schematically show cross-sectional views of various non-limiting exemplary embodiments of the bristled component exemplifying various distributions of arrays of bristles around the bristled component's circumference.
Figure 10B:
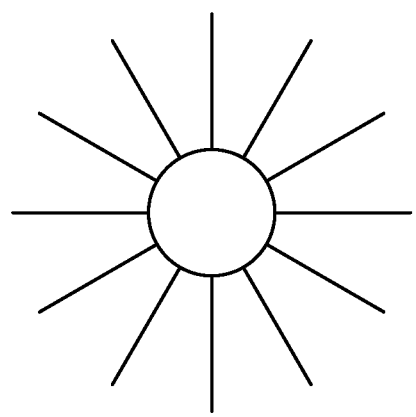
Figure 10C:
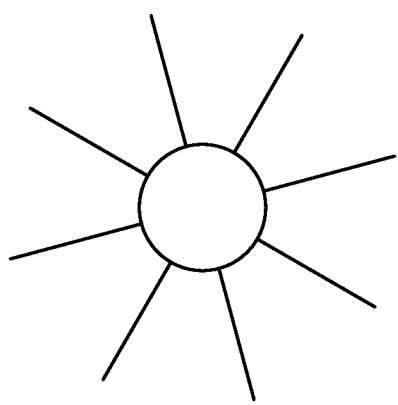
Figure 10D:
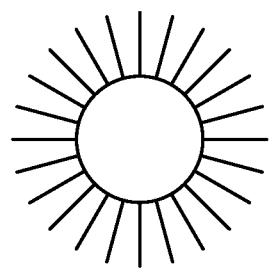
Figure 10E:
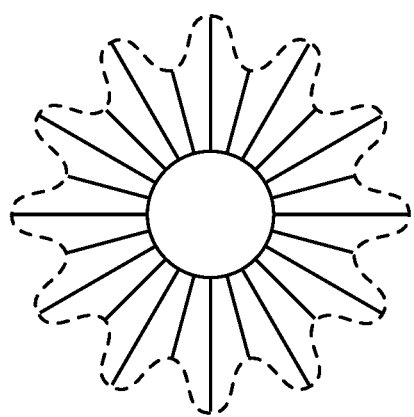
Figure 10F:
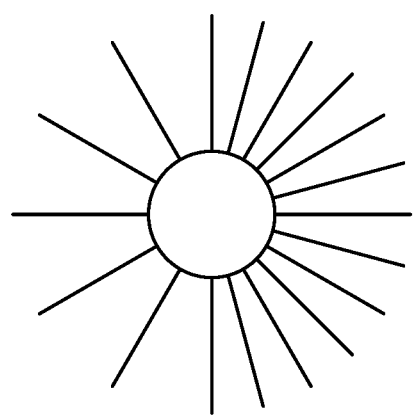
Figure 10G:
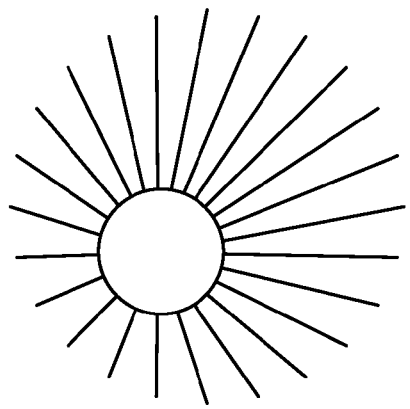
Figure 10H:
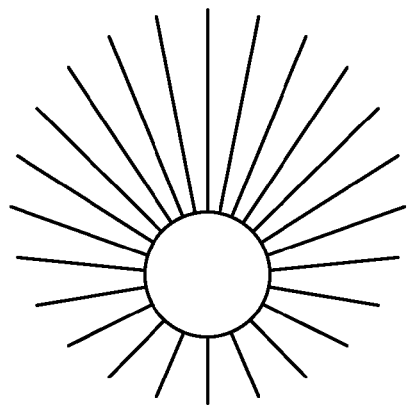
Figure 10I:
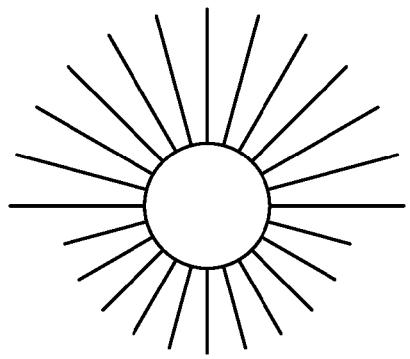
Figure 10J:
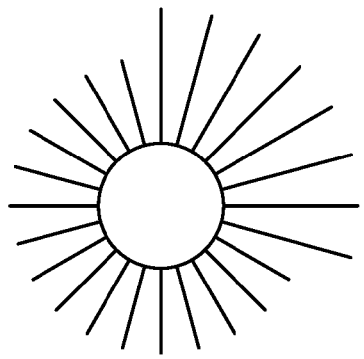
Figure 10K:
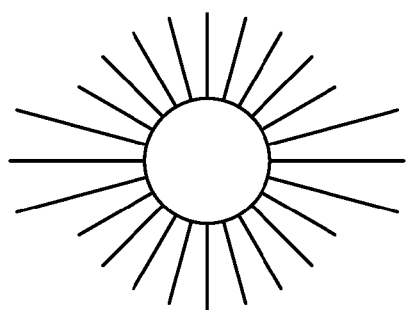
Figure 10L:
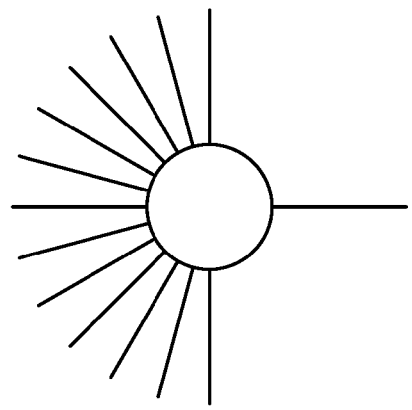
Figure 10M:
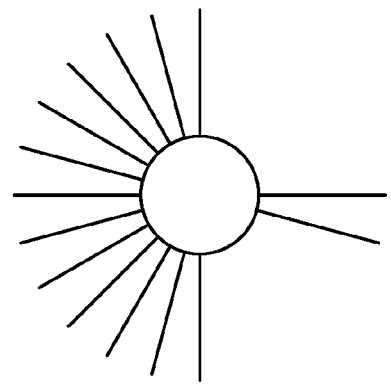

In the embodiment of FIG. 9, the bristled in the first array of bristles 31 are grouped to comprise a first plurality of tufts 41, while the bristles in the second array of bristles 32 are grouped to comprise a second plurality of tufts 42. The first plurality of tufts 41 can be offset relative to the second plurality of tufts 42 along the length of the carrier 20. The extent of the offset between the tufts 41 of the first array of bristles 31 and the tufts 42 of the second array of bristles 32 can be constant throughout the length L of the carrier 20 or any portion thereof—or may vary, depending on the application. In the exemplary embodiment of FIG. 9, the tufts 41 and 42 are offset at approximately equal intervals relative to one another.

The elongated carrier 20 can have any suitable shape. In several exemplary embodiments shown herein, the elongated carrier 20 has a longitudinal slot 50 disposed along the carrier's length L, FIG. 1B. The slot 50 can have any suitable shape. For example, the slot 50 can beneficially form a generally V-shaped contour, as viewed in a cross-section perpendicular to the longitudinal axis 21. The V-shaped slot 50 has a first inner surface 51 and a second inner surface 52 angled relative to the first inner surface, the first and second inner surfaces 51, 52 forming an angle B therebetween. In one embodiment, the angle B can comprise from about 1 degrees to about 179 degrees. In another embodiment, the angle B can comprise from about 5 degrees to about 90 degrees. In still another embodiment, the angle B can comprise from about 10 degrees to about 45 degrees. In yet another embodiment, the angle B can comprise from about 15 degrees to about 30 degrees.

Figure 6:
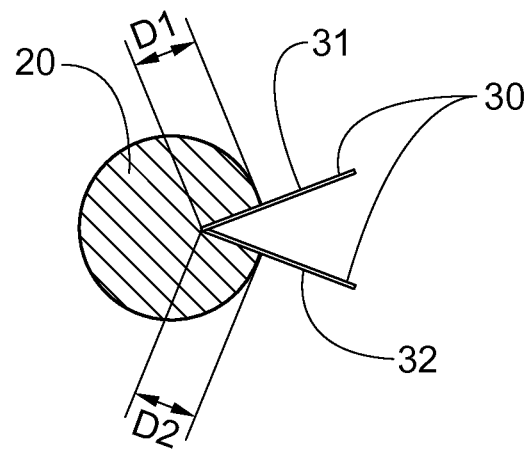
FIG. 6 schematically shows a cross-sectional view of an exemplary embodiment of the bristled component having symmetrical V-shaped slot having inner surfaces of equal length.
Figure 7:
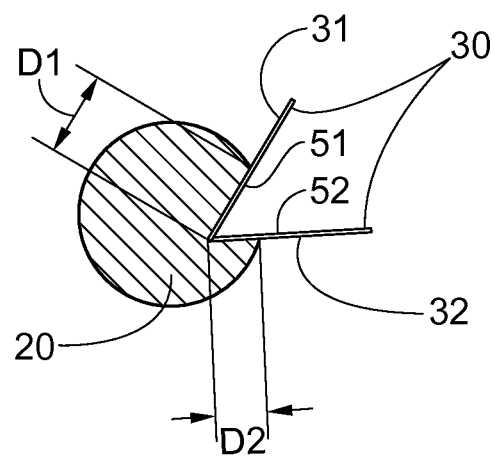
FIG. 7 schematically shows a cross-sectional view of an exemplary embodiment of the bristled component having asymmetrical V-shaped slot having inner surfaces of unequal width.

The V-shaped slot 50 can be symmetrical, i.e., the first inner surface 51 and the second inner surface 52 have substantially equal depths D1, D2, as shown in FIG. 6. Alternatively, the V-shaped slot 50 can be asymmetrical, i.e., one of the inner surfaces 51, 52 can be wider or narrower than the other. In an exemplary embodiment of FIG. 1B, the first inner surface 51 of the slot 50 is narrower than the second inner surface 52 of the slot 50, while in the exemplary embodiment of FIG. 7, the first inner surface 51 (having the depth D1) is wider than the second inner surface 52 (having the depth D2).

The first and second inner surfaces 51, 52 of the slot 50 can conveniently provide contact surfaces to which the bristles 30 can be ultrasonically welded. For example, the first array of bristles 31 can be ultrasonically welded to the first inner surface 51, while the second array of bristles 32 can be ultrasonically welded to the second inner surface 52, FIG. 7. The bristles 30 are welded to the inner surfaces 51, 52 of the slot 50 such that lengthwise portions 35a of the first array of bristles 31, attached to the first inner surface 51, are substantially parallel to the first inner surface 51; and lengthwise portions 35b of the second array of bristles, attached to the second inner surface 52, are substantially parallel to the second inner surface 52 of the slot 50, FIG. 1B. As used herein, the term "lengthwise portion" of a bristle refers to the bristle's portion whose dimension measured in the longitudinal direction is significantly greater than the dimension measured in the direction perpendicular to the longitudinal direction.

Figure 8:
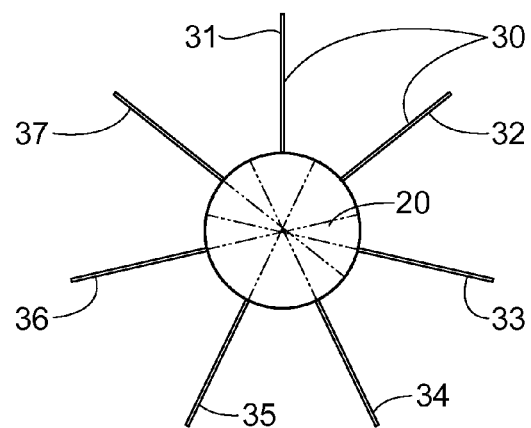
FIG. 8 schematically shows a cross-sectional view of an exemplary embodiment of the bristled component having an odd number of parallel arrays of bristles, wherein none of the arrays of bristles has a corresponding array of bristles disposed directly opposite thereto across the longitudinal carrier.

In an embodiment comprising a plurality of arrays of bristles, the arrays of bristles can extend from the carrier 20 around its circumference, either equidistantly from one another around the carrier's circumference (FIGS. 8, 10A-10D)—or otherwise (FIGS. 9, 10F, 10L, 10M). In an exemplary embodiment shown in FIG. 8, comprising a plurality of arrays of bristles 31, 32, 33, 34, 35, 36, and 37, circumferentially extending from the carrier 20, the arrays of bristles are disposed around the carrier in a non-random pattern wherein none of the arrays of bristles has a corresponding array of bristles disposed directly opposite thereto (across the longitudinal carrier 20). The plurality of arrays of bristles 30 may consist of either an odd number of arrays or even number of arrays. The odd number of bristles can be selected, e.g., from three, five, seven, nine, eleven, thirteen, fifteen, et cetera. FIGS. 9-21 schematically show cross-sectional views of several non-limiting exemplary embodiments of the bristled component 10, comprising multiple arrays of bristles 30 variously distributed around the circumference of the bristled component 10.

The arrays of bristles 30 or individual bristles 30 can differ from one another with respect to one or more physical parameters or characteristics, such as, e.g., material, color, length, thickness, longitudinal shape, cross-sectional shape, specific gravity, rigidity, stiffness, flexibility, elasticity, number of individual bristles per a linear portion of the carrier, pattern of distribution along the carrier, density, surface characteristics (including surface energy), angles of inclination of bristles relative to the carrier, and angles of inclination of individual bristles relative to one another.

The bristles 30 may have any suitable cross-sectional shape, including round, rectangular, triangular, polygon, elliptical, solid, hollow, and irregular shapes, and any combination thereof. FIGS. 20A-20H show several exemplary embodiments of the above. The bristles 30 may be made from monofilaments and composite filaments, such as, e.g., composite filament comprising a core and a shell. In an exemplary embodiment of the bristle 30 shown in FIG. 21, the bristle 30 includes a shell 30 and a core 30b, the latter comprising three individual strands.

In one embodiment, the bristled component 10 may further comprise a core 60, to which the longitudinal carrier 20 is attached. In an exemplary embodiment of FIG. 22, a fragment of the bristled component 10 is shown as comprising a core 60 and a plurality of longitudinal carriers 20. The core 60 may comprise any suitable material, e.g., PET, Nylon, Polypropylene, and others. The core 60 may have any suitable cross-section, e.g., round, rectangular, triangular, polygonal, elliptical, solid, hollow, and irregular shapes (similar to those shown in FIGS. 20A-20H, without regard to scale).

One skilled in the art would realize that the types of multi-component structures, described herein with respect to the carrier 20, can be utilized also for the construction of the core 60; and any suitable method of making the core 60 is contemplated by this disclosure, e.g., molding, stamping, 3D printing, milling, extrusion, pultrusion, and any combination thereof.

Likewise, any suitable method of attaching the carrier 20 to the core 60 can be in the process disclosed herein, including, without limitation, those utilizing adhesive materials, ultrasonic welding, heat melting, as well as mechanical means, such as, e.g., those using interlocking or sliding protrusion and/or slots and the like.

The disclosure is also directed to a cosmetic applicator comprising the bristled component, as described herein. In several exemplary embodiments of FIGS. 11-16, a cosmetic applicator 200 comprises at least one stem 210 having a proximal end 211, including a handle 211a, a distal end 213 opposite to the proximal end 211, and a stem's surface 212. The bristled component 10 can be attached to the stem 210 according to various patterns. Alternatively or additionally, the stem 210 can comprise the bristle component 10. In the latter configuration of the applicator 200, the bristled component-stem should beneficially possess suitable rigidity.

The cosmetic applicator 200 can utilize a single bristled component 10 that can be designed to perform one or more functional tasks. Alternatively the cosmetic applicator 200 can utilize a plurality of bristle components 10, structured and configured to perform various functional tasks, such as, for example, heavy-loading mascara application, increased-volume mascara application, lift-and-curl mascara application, lash-separation mascara application, and any combination thereof. As one skilled in the art would recognize, the heavy-loading mascara application involves accurately loading the brush and controlling the product-loading profile on the brush to provide for a heavy load of product to be dispensed to the lashes. This is typically accomplished by passing the loaded brush through a wiping aperture significantly larger than the core of the brush. The increased-volume mascara application involves the ability of the brush to deposit formula on the visible profile of the lash in a way that gives the lashes a greater visual thickness or diameter. Ideal applicators will deliver heavy loading in a directed way without causing clumping of the lashes together so that individual lash volume is maximized. The lift-and-curl mascara application involves the application of mascara in such a way that the product helps to hold the lashes in a groomed curled position or enables the chemistry to set the lash shape in a curled position. Preferential deposition of some products may require more product depositions in the lower half of the lash length to avoid the weight of the product diminishing the curl effect through gravity. The lash-separation mascara application involves the ability for the user to comb and separate the lashes while leaving the desired distribution of the product on the lashes. Best separation applicators deposit an even amount of the product on each lash without grouping or bunching lashes together where they might adhere to one another as the product on some lashes bonds with the product on adjacent lashes.

Figure 11:
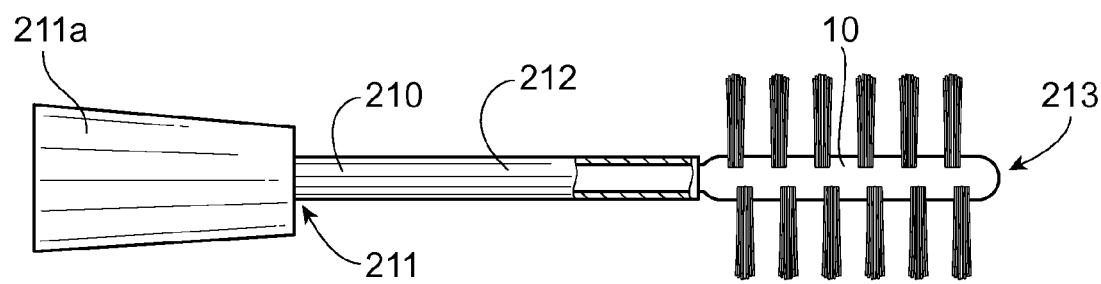
FIG. 11 schematically shows an exemplary embodiment of a cosmetic applicator comprising a stem, having a proximal end and a distal end, and the bristled component attached to the distal end of the stem, wherein the bristled component is substantially parallel to the stem.

In the embodiment of FIG. 11, the bristled component 10 is attached to the distal end 213 of the stem 210 so that the bristled component 10 is substantially parallel to the stem 210. The bristled component 10 can be attached to the stem 210 either permanently or removably. In the latter instance, shown in FIG. 11, the stem 210 that is at least partially hollow, and the bristled component 10 can be coupled to the stem 210 removably, e.g., through a frictional connection, thread, a sliding mechanism comprising mating/locking parts—or otherwise by any means known in the art.

Figure 12:
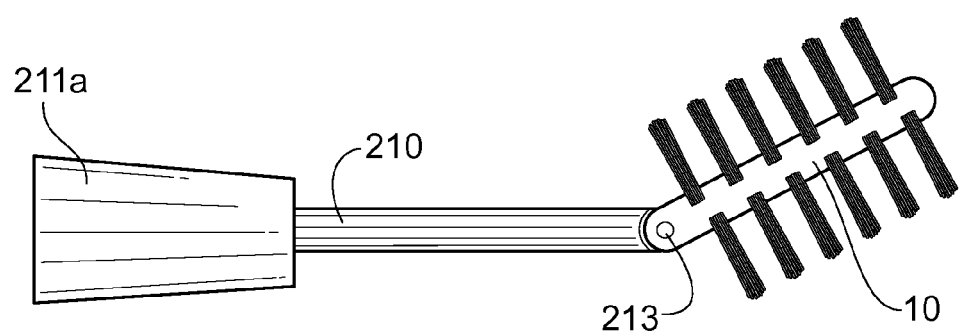
FIG. 12 schematically shows another exemplary embodiment of a cosmetic applicator comprising a stem, wherein the bristled component is attached to the stem's distal end at an angle relative to the stem.

In the embodiment of FIG. 12, the bristled component 10 is attached to the stem 210 so that the bristled component 10 can be angled relative to the stem 210. The angled position of the bristled component 10 can be permanent. Alternatively, the bristled component 10 can be attached to the stem 210 to be angularly movable relative thereto. Any means known in the art can be used to attach, either permanently or removably, the bristled component 10 to the distal end of the stem 210 for angled configuration. For example, a hinge 213 or a similar rotational connection, such as a ball socket, can be utilized. A "living" hinge (not shown) can also be used to position and/or adjust, as may be desired, one portion of the bristled component 10 relative to the other portion thereof, and relative to the stem 210, in an angled configuration. The living hinge may be particularly useful in an embodiment of the bristled component 10 having the stem 120 comprising a bendable wire (not shown) that can be bent as desired.

Figure 13:
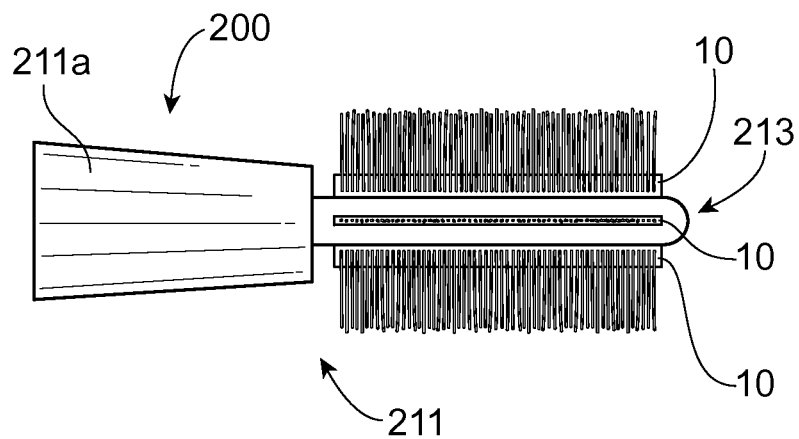
FIG. 13 schematically shows an exemplary embodiment of a cosmetic applicator comprising a stem, wherein a plurality of the bristled components is attached to the stem between the stem's opposite ends.
Figure 17:
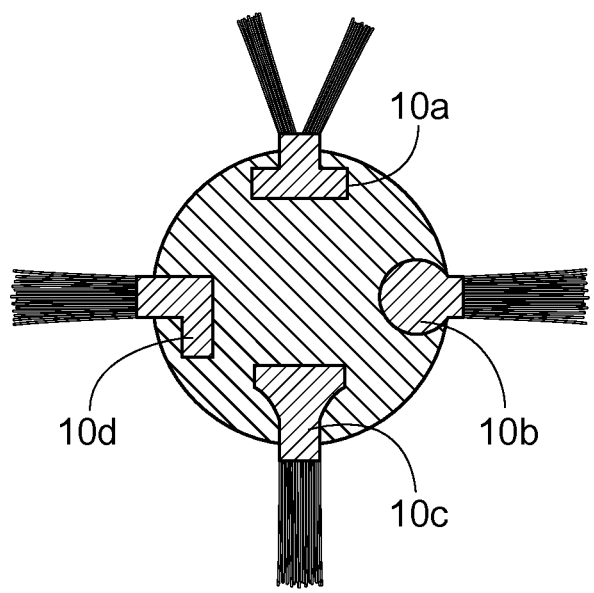
FIG. 17 schematically shows a cross-section of an exemplary embodiment of the applicator wherein the bristled components are slidably attached to the stem via grooves in the stem and mating protrusions in the bristled components.

In the embodiment of FIG. 13, several bristled components 10 are attached to the stem 210 intermediate the stem's proximal and distal ends 211, 213 and in a parallel configuration relative to the stem 210. In such a configuration, the bristled component or components 10 can be permanently affixed to the stem 210 by any means known in the art, for example by adhesive gluing, ultrasonic welding, and mechanical means. Alternatively, the bristled component or components 10 can be removably attached to the stem. In FIG. 17, e.g., the bristled components 10a, 10b, 10c, and 10d are slidably attached to the stem 210 via grooves formed in the stem 210 and correspondingly profiled protrusions in the bristled components 10. In such or similar embodiment, one bristled component can be replaced with another bristled component that has different functionality, or for the purposes of testing or demonstration. This ability of the applicator 200 to removably and interchangeably receive various bristle components 10 contributes to the applicator's increased versatility, for it could allow a consumer to accomplish, with a single applicator, various functional tasks, e.g., such as those described herein above.

Figure 14:
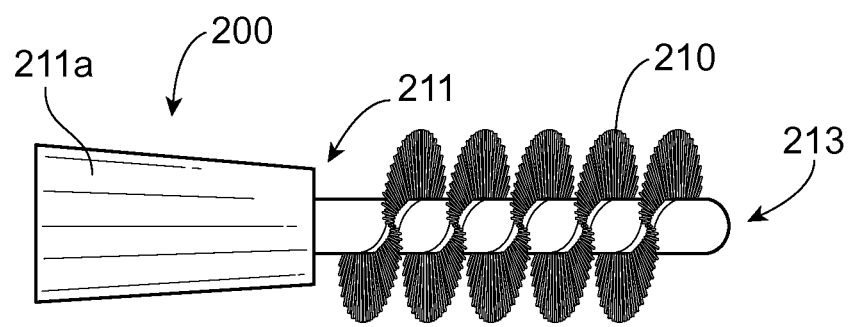
FIG. 14 schematically shows an exemplary embodiment of a cosmetic applicator comprising a stem, wherein the bristled component, attached to the stem intermediate the stem's opposite ends, has a shape of a substantially helical coil spiraling around the stem.
Figure 15:
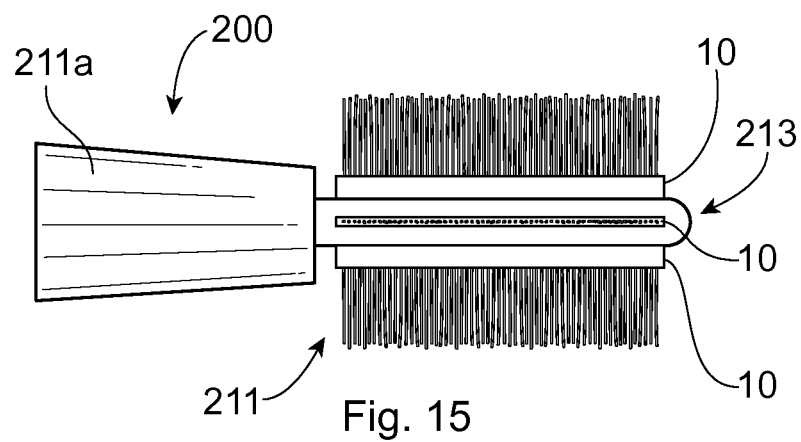
FIG. 15 schematically shows an exemplary embodiment of an applicator similar to that of FIG. 13, before the stem and the bristled component attached thereto have been twisted around the stem's longitudinal axis.
Figure 16:
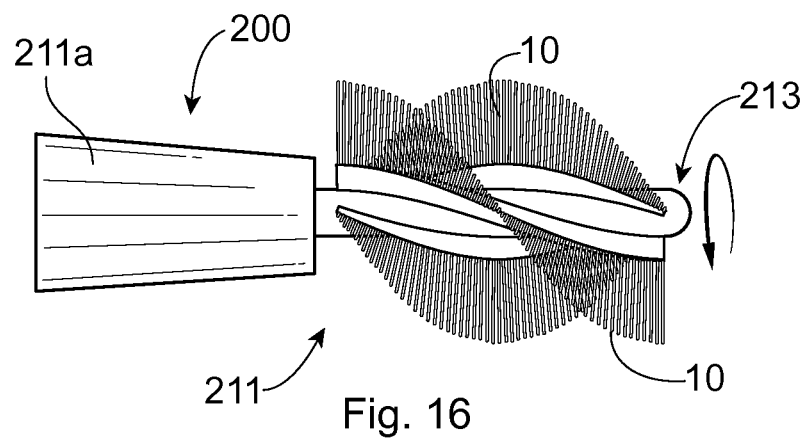
FIG. 16 schematically shows the applicator shown in FIG. 15, after the stem and the bristled component attached thereto have been twisted around the stem's longitudinal axis, thereby causing the bristled component to form a shape of a substantially helical coil spiraling around the stem's longitudinal axis.

As is shown in FIGS. 14 and 16, the bristled component 10 can be attached to the stem 210 to comprise a substantially helical coil spiraling around the stem's longitudinal axis. This can be accomplished by placing the bristled component 10 in a desired spiral configuration around the stem 210—and attaching, either permanently or removably, the so placed bristled component 10 to the stem 210, FIG. 14. Alternatively or additionally, the bristled component 10 can be attached to the stem 210 substantially parallel to the stem's longitudinal axis (FIG. 15)—and then the stem 210, together with the bristled component 10 attached thereto, can be twisted around its own longitudinal axis—to cause the bristles 30, ultrasonically welded to the stem 210, to change their position relative to one another acquired during ultrasonic welding. In one specific embodiment, illustrated in FIG. 16, the stem 210, together with the bristled component 10 attached thereto, is being twisted around its own longitudinal axis until the bristled component 10 acquires a desired spiral shape (FIG. 16).

The elements of the disclosure, including the processes, described herein can be used to manufacture a personal-care applicator of any known design, including, without limitation, a conventional single-brush applicator, a dual-sided applicator, a roller applicator, a so-called "clam-shell" applicator, a so-called "tweezers" applicator, a applicator comprising an unfolding brush, and others. While the invention is not limited to the listed applicators, several exemplary embodiments of those are briefly described and illustrated herein.

An embodiment of the cosmetic applicator 300 shown in FIG. 39 includes a so-called dual-ended configuration, in which a handle 311 of the applicator is disposed between the two ends of the applicator, and wherein the applicator includes either at least one bristled component 10 attached to the stem 210—or the bristled component itself forms the stem 210, as is described herein. Such a dual-ended applicator 300 can accomplish a two-step product application, by having two different brushes at its opposite ends, e.g., a heavy-loading brush on one end and a lift-and-curl brush on the opposite end, or increased-volume brush on one end and a lash-separation brush on the opposite end. For this purpose, the dual-ended applicator may have, e.g., a molded brush or a twisted-wire brush on one end and an ultrasonically-welded brush on the opposing end. Alternatively, two ultrasonically-welded brushes in accordance with the present disclosure, and having differential physical properties, may be used in the dual-ended applicator.

Figure 40:
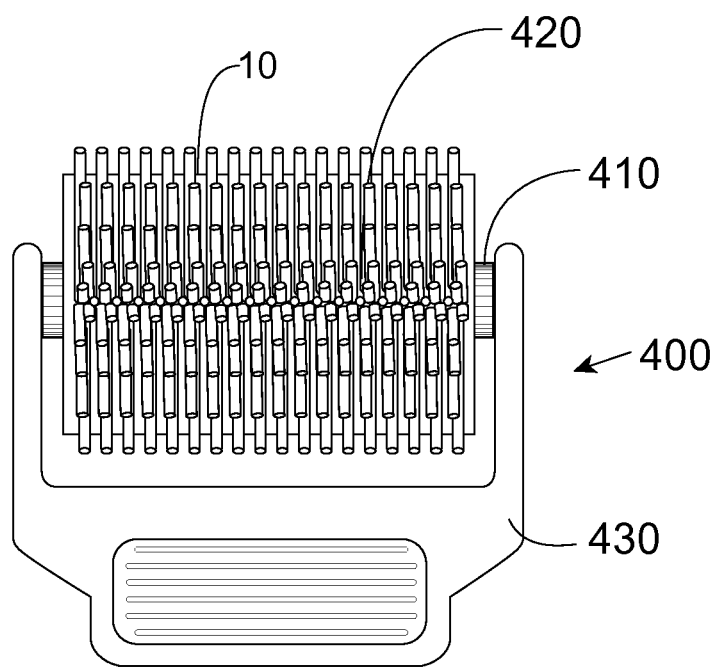
FIG. 40 schematically shows an exemplary embodiment of a roller applicator.

FIG. 40 schematically shows an exemplary embodiment of a roller applicator 400, comprising a cylindrical bristled roller 420 attached to a frame 430 for a rotational movement within the frame 430. Any known means, such as, e.g., pins and ball bearings 410, can be used to attach the roller 420. Either the entire functional surface, or any part thereof, of the roller 420 can comprise the bristled component 10 of the invention. While the embodiment of the roller applicator 400 shown in FIG. 40 comprises plurality of individual bristles extending from the roll, one skilled in the art would readily appreciate that other embodiments, comprising, e.g., a felt-like working surface instead of, or in addition to, the individual bristles, can also be made in accordance with the present disclosure.

Figure 41A:
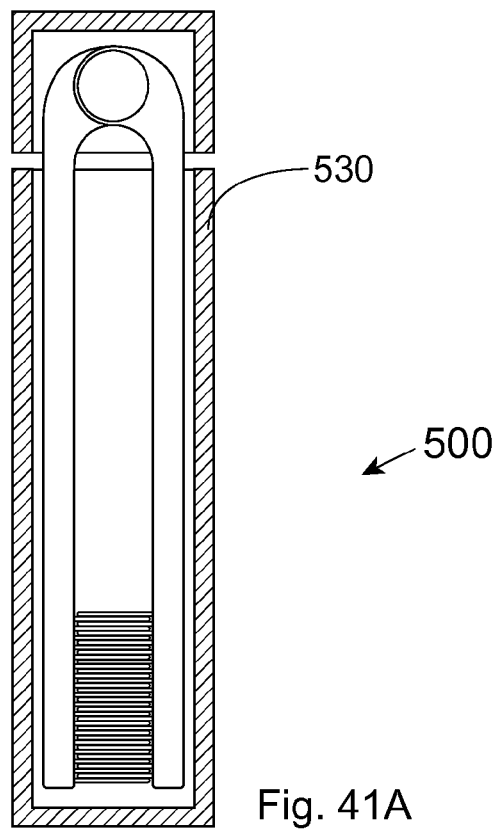
FIGS. 41A and 41B schematically show an exemplary embodiment of a "tweezers" applicator.
Figure 41B:
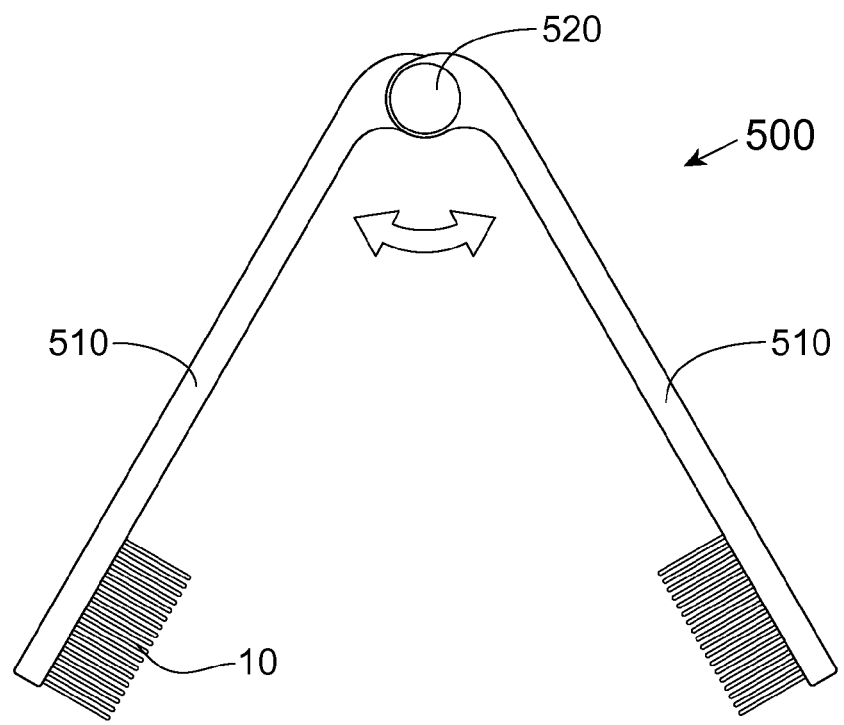

An exemplary embodiment of a so-called "tweezers" applicator, shown in FIGS. 41A and 41B, comprises a pair of legs interconnected at one of each of their respective ends for relative movement of the other of their respective ends, which are free. FIG. 41A shows the applicator 500 in a folded position inside a case 530. At least one of those free ends can comprise the bristled component 10 of the invention. The two legs 510 of the applicator 500 can be beneficially interconnected for relative rotation by, e.g., a pin, a ball bearing, or any other means known in the art. The connection between the two legs 510 can be spring-loaded, as known in the art. An embodiment is contemplated (but not shown) in which the legs 510 are permanently affixed to one another, and their relative movement can be accomplished by flexing of one of the legs relative to the other.

Figure 42A:
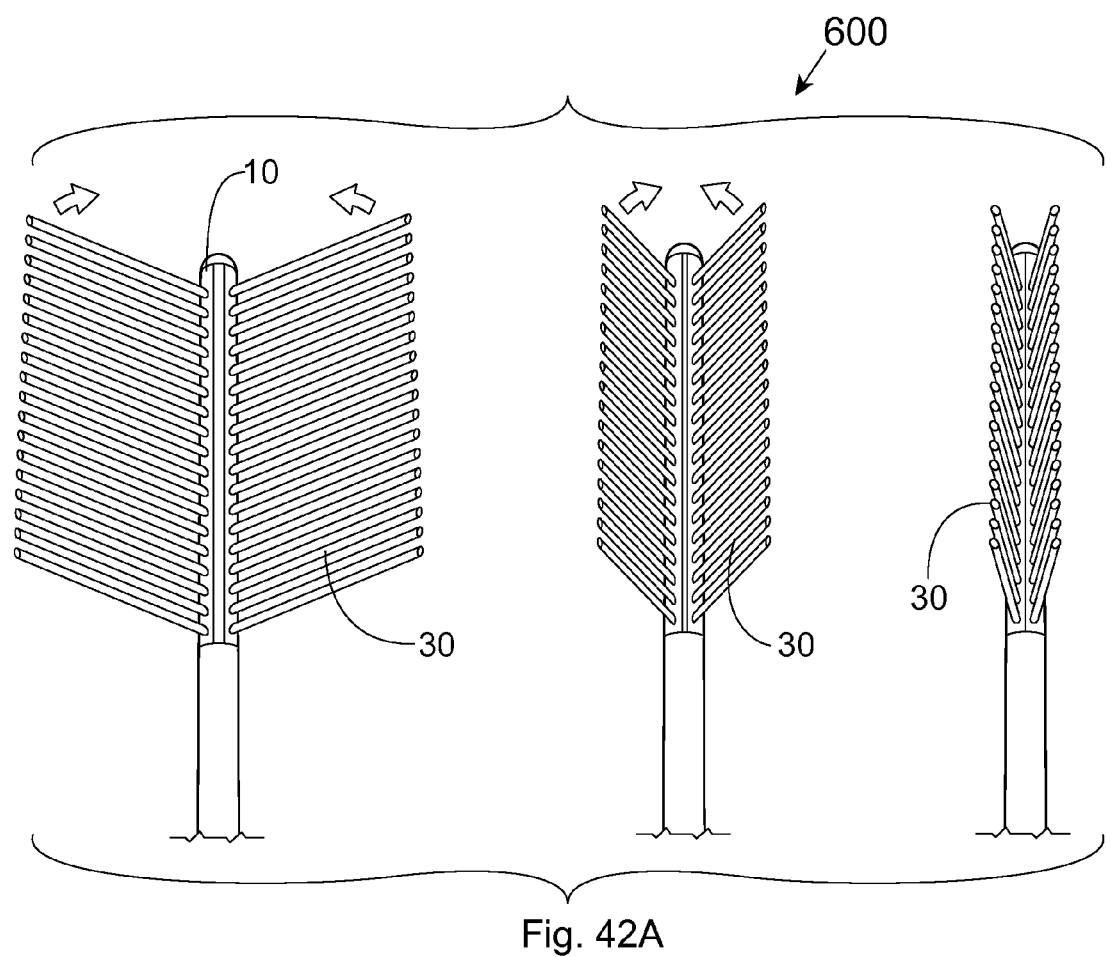

One exemplary embodiment of an applicator 600 having a changing brush configuration is shown in FIGS. 42A-42C. While two arrays of bristles 30 are shown in the figures, the applicator 600 can comprise a plurality of arrays of bristles 30. These bristles 30 can be structured to rotate or otherwise move relative to one another—to impart a desired functionality or to accommodate a shape of a holding case. In the embodiment shown, the bristles 30 are part of the bristled component 10 that is structured and configured to fold and unfold, thereby changing the brush's shape. The brush can be designed to increase the density of the bristles 30 of the folded brush relative to that of the unfolded brush. It can be designed, e.g., to have the bristles 30 in the adjacent arrays to be offset in a longitudinal direction of the brush, so that the density in the fully folded brush will double relative to the density of the unfolded brush.

One permutation of the applicator 600 described above is shown in FIGS. 42B and 43C, illustrating the folding brush in combination with a hollow stem 630. In this embodiment, the support 20 of the bristled component 10, can be moved inside the hollow stem 630, e.g., with a lever 650, from a fully folded position (FIG. 42B) to a fully unfolded position (FIG. 42C). The hollow stem 630 can beneficially comprise gradually flaring sliding surfaces (not shown) structured and configured to facilitate folding and unfolding of the bristles 30.

Figure 43A:
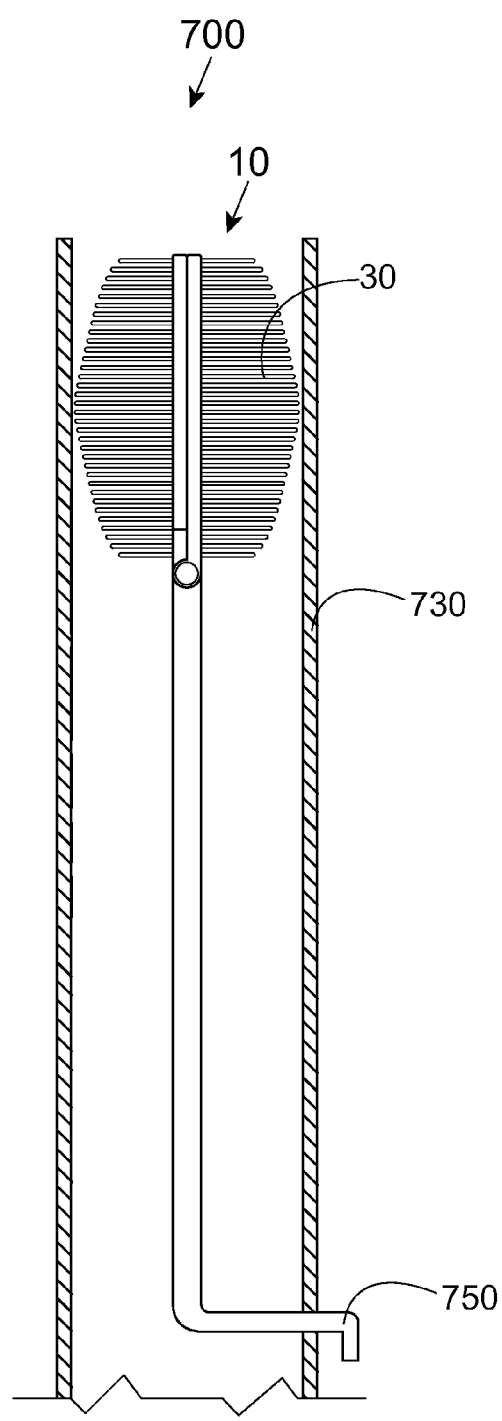
FIGS. 43A and 43B schematically show another exemplary embodiment of an applicator having a folding brush.
Figure 43B:
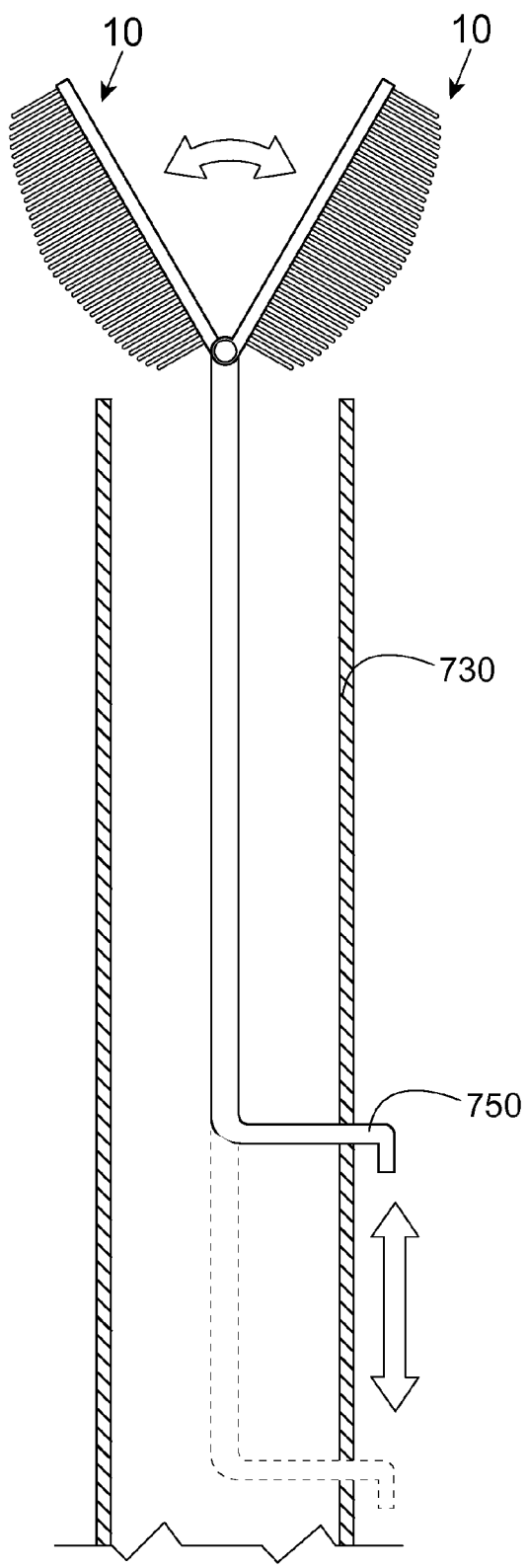

Another embodiment of the applicator having a folding brush is schematically shown in FIGS. 43A and 43B. An applicator 700 comprises a hollow stem 730 and a lever 750 movable inside the hollow stem 730. A pair of mutually opposite bristled components 10 can be attached to one end of the lever 750 for the combined movement inside the stem 730. The bristled components 10 can be spring-loaded or otherwise structured to rotate away from one another when the lever 750 moves the bristled components 10 out of the hollow stem 730. In the embodiment of FIGS. 43A and 43B, showing two bristled components 10, the bristled components 10 are positioned to have their respective bristles 30 extend in opposite directions when the brush is in the folded position. One skilled in the art will appreciate that the embodiment shown can also comprise more than two bristled components 10 structured and configured to unfold and fold as principally explained herein.

Figure 44A:
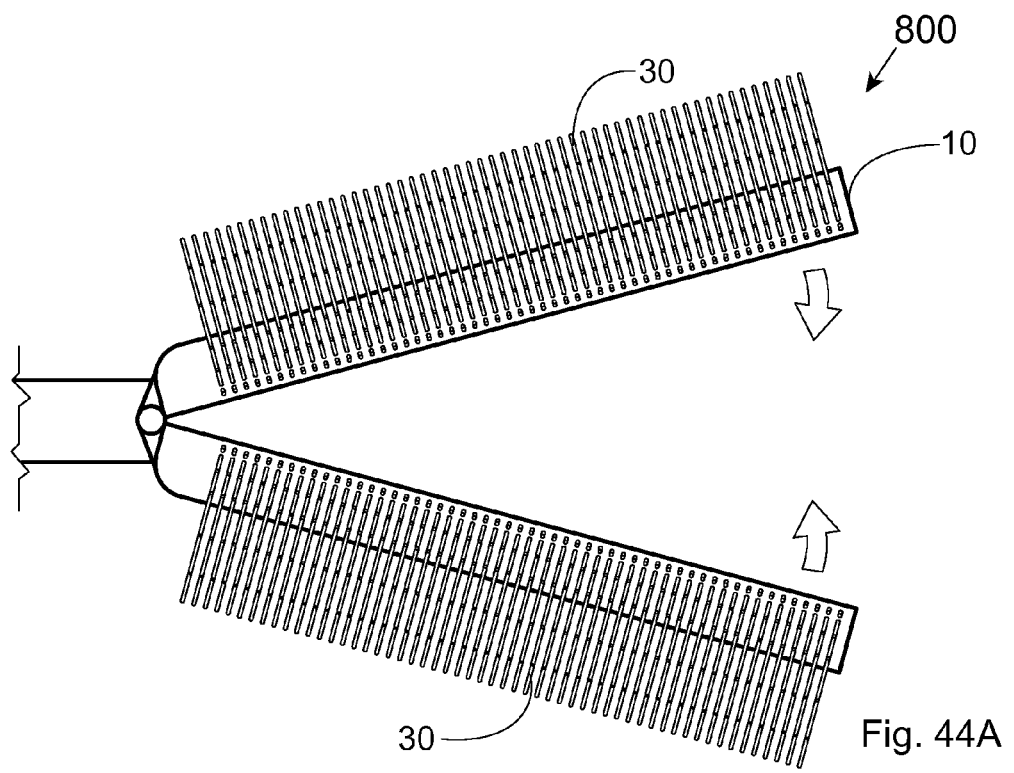
FIGS. 44A-44D schematically show other exemplary embodiments of an applicator having a folding brush.
Figure 44B:
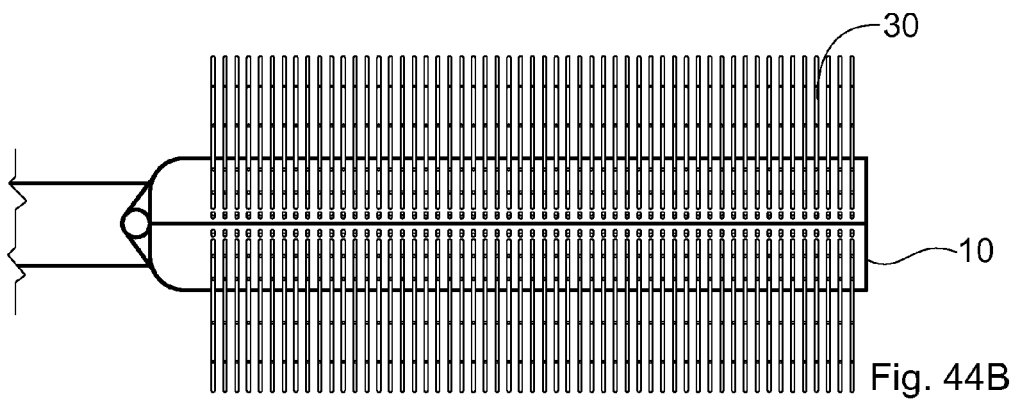
Figures 44C, 44D:
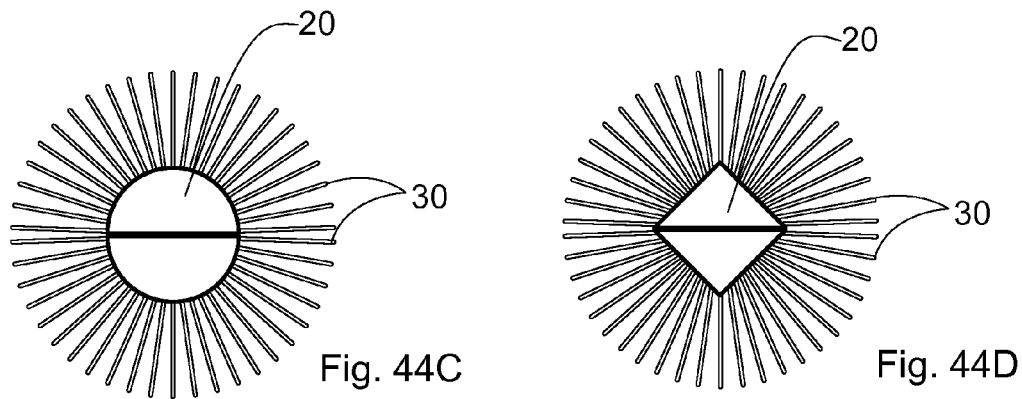

FIGS. 44A-44D schematically show exemplary embodiments of an applicator having a folding brush similar to that shown in FIGS. 43A and 43B. In FIGS. 44A, 44B, and 44C, each of the two bristled components 10 comprises a support 20 that has a semi-cylindrical shape, specifically shown in a cross-sectional view of FIG. 44C. In a folded position, these semi-cylindrical supports 20 form a cylindrical shape. In FIGS. 44A, 44B, and 44D, two bristled components 10 comprise a substantially prismatic support 20 that has a triangular cross-sectional shape, specifically shown in FIG. 44D. In a folded position, these triangular supports 20 form a rectangular or square cross-section. One skilled in the art will readily appreciate that other cross-sectional shapes of the support can be utilized, if desired, including, without limitation, elliptical, polygonal, irregular, and any combination thereof.

As schematically shown in FIGS. 23A-26, a basic continuous process for making the bristled component 10 can comprise several consecutive steps. A step of continuously wrapping at least a first strand of material or yarn 130 around a moving endless band 140 can be conducted, e.g., at a yarn-wrapping station 150. The band 140 has a top side 141, a backside 142, and at least a first edge 143. In FIG. 23B, the band 140 also has a second edge 144. The strand of material 130 can comprise any suitable element, such as yarn, thread, monofilament, composite filament, and the like. An embodiment is contemplated in which the strand of material 130 comprises a film. For convenience, the terms "strand of material," "yarn," and the like, may be used herein synonymously. The first strand of material, or yarn, 130 may comprise any desired number of yarns, e.g., two, three, four, et cetera; these yarns may be identical—or may differ from one another in one or several physical characteristics. Non-limiting examples of such physical characteristics include yarn's material, thickness, cross-sectional shape, surface energy, elasticity, rigidity, color, and other characteristics or parameters.

The yarn 130 can comprise any material suitable for ultrasonic welding to the support strips 120. Unlimited examples of such a material include, e.g., nylon and polyester. An embodiment is contemplated in which the yarn 130 is made of a composite structure comprising both a material (or materials) suitable for ultrasonic welding and a material (or materials) not suitable for ultrasonic welding. The first yarn 130 can be wound around the band 140 at a certain controlled pace so that a predetermined density of the yarn 130 can be achieved, particularly at the point of the yarn's juxtaposition with the first and second edges 143, 144. This density can be constant—or can vary throughout the process, depending on the application. Any suitable method of winding the yarn 130 around the band 140, known in the art, can be used.

Figure 23A:
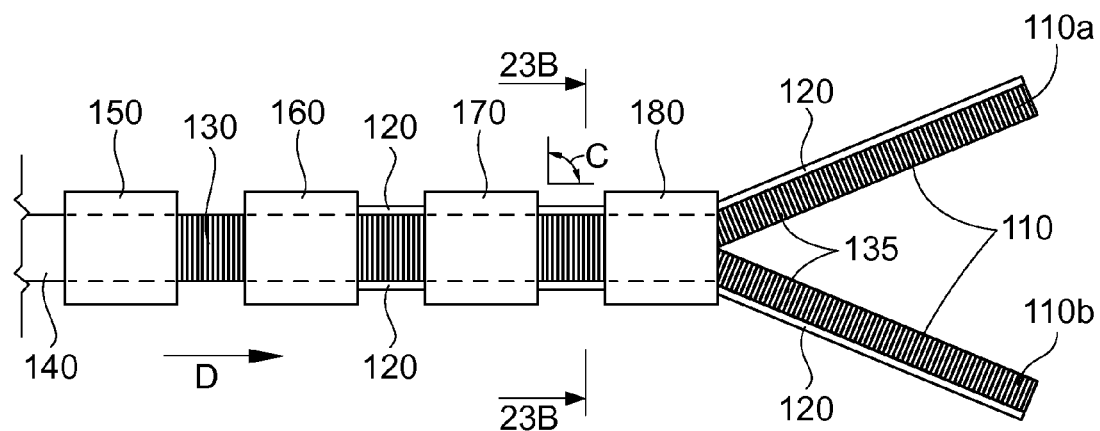
FIG. 23A schematically shows an exemplary process for making the bristled component.

In an embodiment incorporating several yarns 130, each of the yarns 130 can be wound around the band 140 according to its own pattern, including density, and an angle of inclination C relative to the direction D in which the band 140 is traveling, FIG. 23A. This pattern with respect to each yarn 130 may be identical to or may differ from the pattern or patterns of the other yarns 130 being would around the band 140. The inclination angle C can be from +45 degrees to −45 degrees. In the exemplary embodiment of FIG. 23A the angle C is approximately 90 degrees.

Alternatively, the yarn or yarns 130 can be wound at different densities and/or angles C, depending on the chosen design of the bristled component 10 being manufactured. For example, in an embodiment of FIG. 26, a first yarn 131 and a second yarn 132 are shown wrapped around the band 140 at differential angles. Relative to the band's longitudinal axis T (i.e., the direction of the band's movement), the resulting pattern of the yarns 131, 132 wrapped around the band 140 will comprise portions of the first yarn 131 and portions of the second yarn 132 disposed on the top side 141 of the band 140. The portions of the first yarn 131 disposed on the band's top side 141 form a first angle C1 relative to the band's longitudinal axis T, and the portions of the second yarn 132 disposed on the band's top side 141 form a second angle C2 relative to the direction of the band's longitudinal axis T. In the exemplary embodiment of FIG. 26, the angles C1 and C2 differ.

The process can further include a step of continuously juxtaposing a support strip 120 with the band 140 having the yarn or yarns 130 wound around. The support strip or strips 120 can be continuously or intermittently supplied by or through a strip-application station 160, FIG. 23A. The support strip 120 may have any suitable longitudinal and cross-sectional shape, as described herein in the context of the longitudinal support 20. The support strip 120 can be made of any material compatible with the material of the yarn 130 for the purposes of ultrasonic welding therebetween. An embodiment is contemplated in which the support strip 120 is made of a composite structure comprising both a material (or materials) suitable for ultrasonic welding and a material (or materials) not suitable for ultrasonic welding. The support strip 120 has a longitudinal welding surface structured and configured to facilitate formation of an ultrasonic bond directly with the yarn or yarns 130. One embodiment of such a surface, comprising a V-shaped cross-sectional profile is described herein in the context of the longitudinal support 20.

Figure 23B:
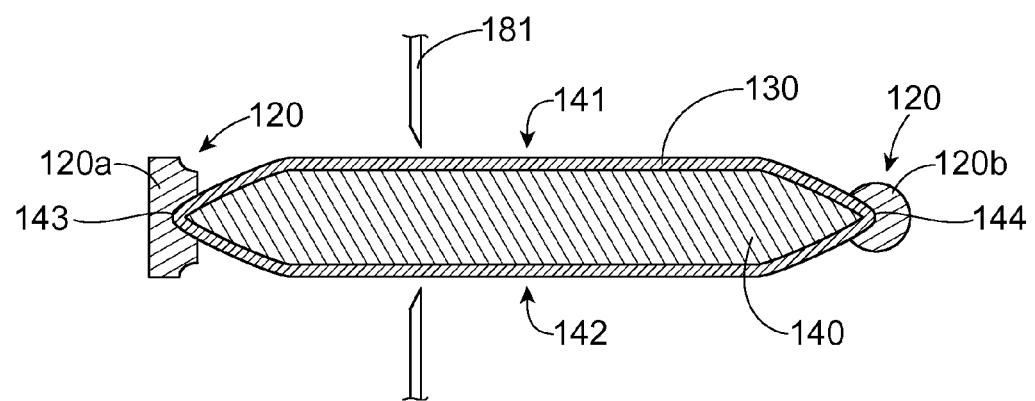
FIG. 23B is a schematic cross-sectional view taken along lines B-B of FIG. 23A.
Figure 27:
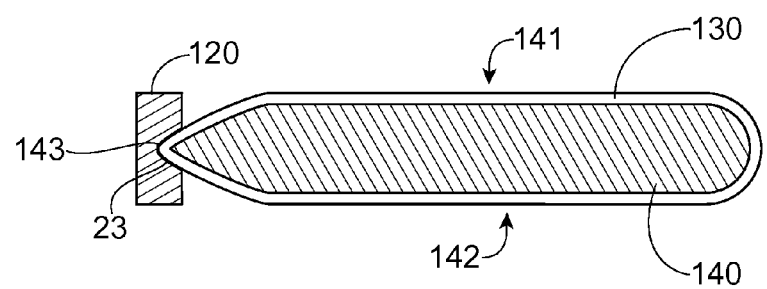
FIG. 27 schematically shows a cross-section of an exemplary embodiment of an endless band used in the process of the invention, having a yarn wrapped around it, wherein the yarn forms endless loops.
Figure 28:
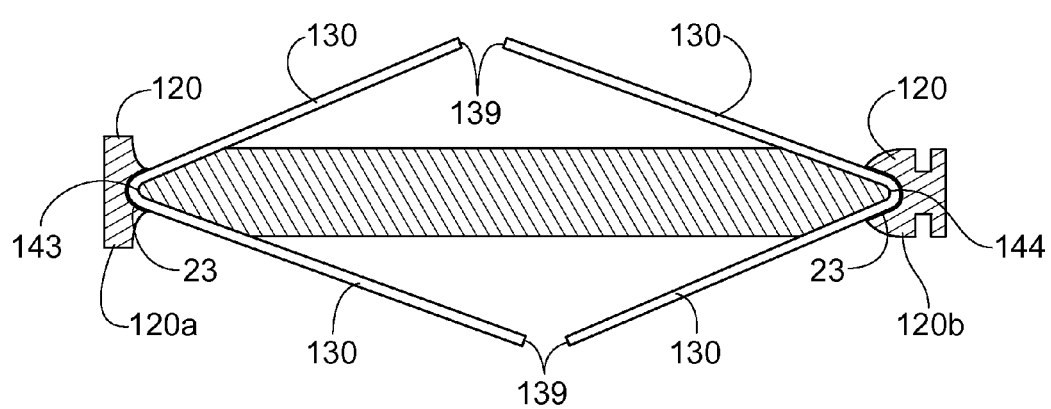
FIG. 28 schematically shows a cross-section of an exemplary embodiment of an endless band used in the process of the invention, having a yarn wrapped around the bend and ultrasonically welded to support strips juxtaposed with the bands mutually opposite edges, wherein the yarn is split to forms a plurality of free ends.
Figures 31A, 31B, 31C:
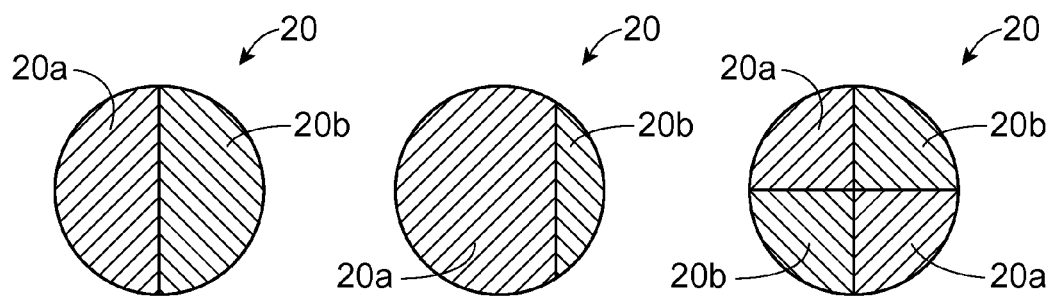
FIGS. 31A-31G schematically show several exemplary embodiments, in cross-sections, of a carrier comprising side-by-side bi-component structures.
Figures 31D, 31E, 31F:
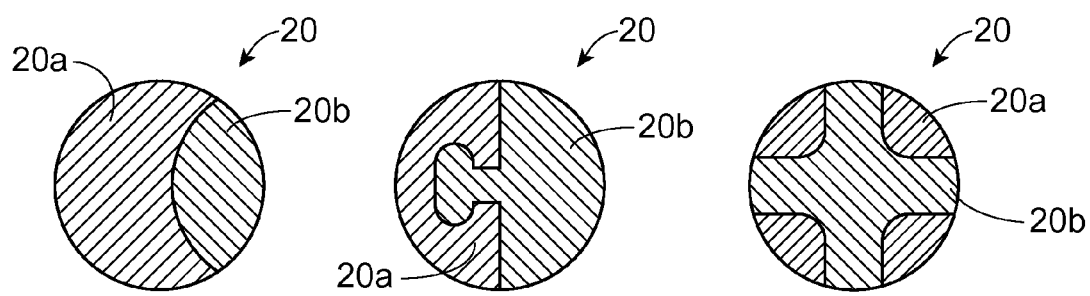
Figure 31G:
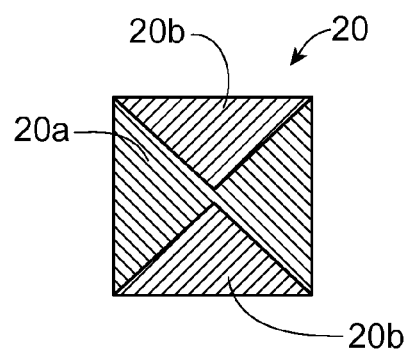

In the exemplary embodiments of the process shown in FIG. 23B and FIG. 28, a first support strip 120a is juxtaposed with the first edge 143 of the band 140, and a second support strip 120b is juxtaposed with the second edge 144 of the band 140. In several exemplary embodiments shown, the first support strip 120a differs from the second support strip 120b, FIGS. 23B, 28, and 30. But one skilled in the art would readily understand that identical or similar first and second support strips 120a, 120b can also be used. Also, an embodiment is contemplated in which only one support strip is used, FIG. 27.

The process further includes a step of ultrasonically welding the yarn 130 to the support strip 120, e.g., at a welding station 170, FIG. 23A. Several details of ultrasonic welding, which can be used in the process of the disclosure, are described in several patents listed herein and incorporated herein by reference. The ultrasonic welding involves, generally, an ultrasonic horn and driver fixtures (not shown). The ultrasonic welding can be performed at the predetermined density or densities of the yarn 130, which may be constant or varied, depending on the application and the design of the bristled component 10 being made. If desired, an angled configuration, as viewed in cross-section, of the bristles 30 relative to the carrier 20 in the bristled component 10 being made can be achieved by placing the support strip or strips 120 at an angle relative to the band 140, FIG. 30.

During the ultrasonic welding, the lengthwise portions of the yarn 130 abutting the support strip 120 and the band 140 in the area of its edge 143, can form a direct ultrasonic bond 23 (FIGS. 1B, 27 and 28) between the surface of the support strip 120 and the surfaces of the lengthwise portions of the yarn 120. In the continuous process, a continuous bristled strip or strips 110 can be formed, comprising the support strip 120 and a plurality of yarn filaments 130 ultrasonically bonded to the support strip 120 and outwardly extending therefrom. The plurality of yarn filaments 130, ultrasonically bonded to the strip 120 at the band's edge 143, may comprise endless loops, FIG. 27. Alternatively, the plurality of yarn filaments 130, ultrasonically bonded to the strip 120, may have a plurality of free ends 139, FIG. 28. The latter can be achieved by splitting the yarn filaments 130, as is described herein below.

The process may further comprise splitting the at least first yarn 130, e.g., at a splitting station 180, thereby forming a plurality of free ends of the at least first yarn 130, FIG. 23A. In an embodiment of the process that utilizes first and second support strips 120a, 120b, the splitting of the yarn 130 will result in the formation of first and second continuous bristled strips 110a, 110b, each comprising the support strip 120 and a plurality of yarn filaments 135 ultrasonically welded to and extending from the support strips 120, FIG. 23A.

The process can further comprise a step of trimming or otherwise modifying the plurality of yarn filaments 135, e.g., at a modifying station 190, to cause the yarn filaments 135 to acquire the desired length, shape, surface characteristics, and other chosen physical properties, thereby forming finished bristles 30. Modification of yarn filaments may include, without limitation, trimming, coating, temperature treatment, chemical treatment, radiation treatment, as well as changing of surface energy, shape, color, angular orientation, and/or tip rounding. All or a portion of the yarn filaments 135 can be subjected to such a modification. In the exemplary embodiment of the process of FIG. 24, the step of modifying is shown to occur, at the modifying station 190, before the step of cutting, at a cutting station 200, while in the exemplary embodiment of FIG. 25 this order is reversed.

The process can also include a step of modifying the at least first support strip 120. The support-strip modification can include, without limitation, trimming, coating, temperature treatment, chemical treatment, radiation treatment, modification of surface energy, change of shape, and change of color of at least a portion or portions of the support strip. For example, the support strip 120 may be selectively heated and/or partially grinded to form a desired shape thereof. An embodiment is contemplated in which the support strip 120 can be reinforces by addition of another element or material applied or affixed to the support strip 120.

Figure 24:
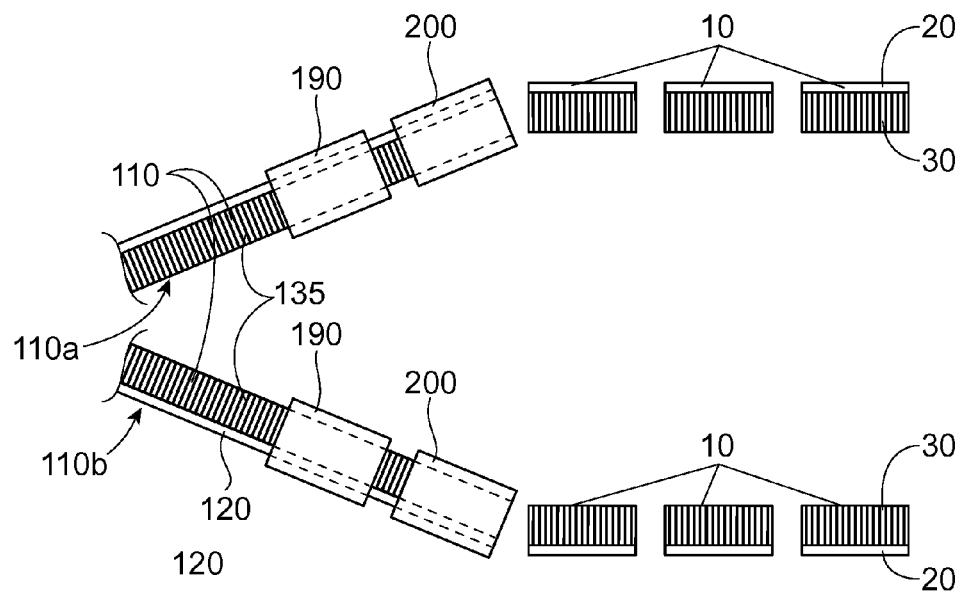
FIG. 24 schematically shows an exemplary embodiment of the process shown in FIG. 23A.
Figure 25:
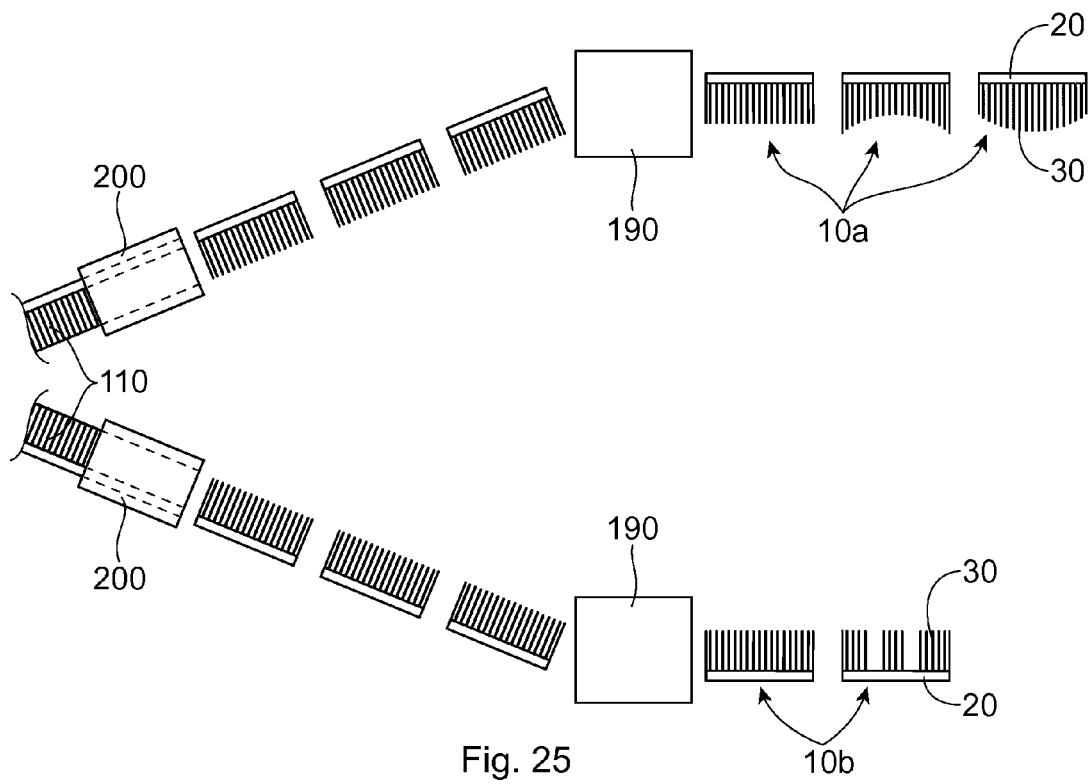
FIG. 25 schematically shows another exemplary embodiment of the process shown in FIG. 23A.
Figure 26:
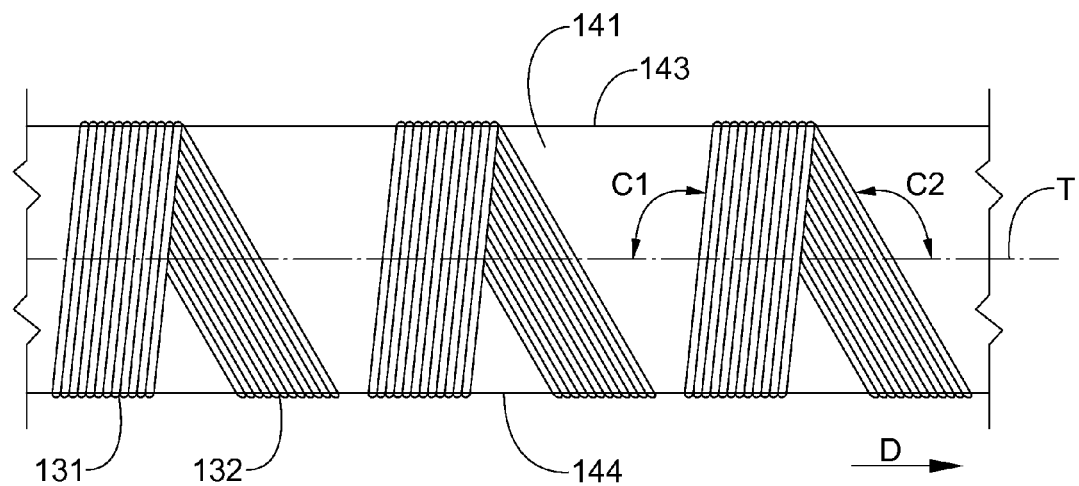
FIG. 26 schematically shows an exemplary embodiment of a pattern of wrapping of two yarns around a band.

The process may comprise a step of cutting the bristled strips 110, e.g., at a cutting station 200, into a plurality of bristled components 10, each comprising a longitudinal carrier 20 and a plurality of bristles 30 ultrasonically welded thereto, FIG. 24. Any suitable cutting tools can be utilized, including, without limitation, blades, heat, chemical means, laser, and others. The step of cutting can be performed either prior to the step of modifying the plurality of yarn filaments 110 (FIG. 25) or after the step modifying the plurality of yarn filaments 110 (FIG. 24), depending on the application. Performing the step of modifying the plurality of yarn filaments after the step of cutting (FIG. 25) can enable a manufacturer to have a greater flexibility in creating a variety of final configurations of the bristled component 10. In an exemplary embodiment of FIG. 25, for example, the shown bristled components 10a differ from one another in their respective bristle patterns, as do the bristled components 10b.

Figure 18:
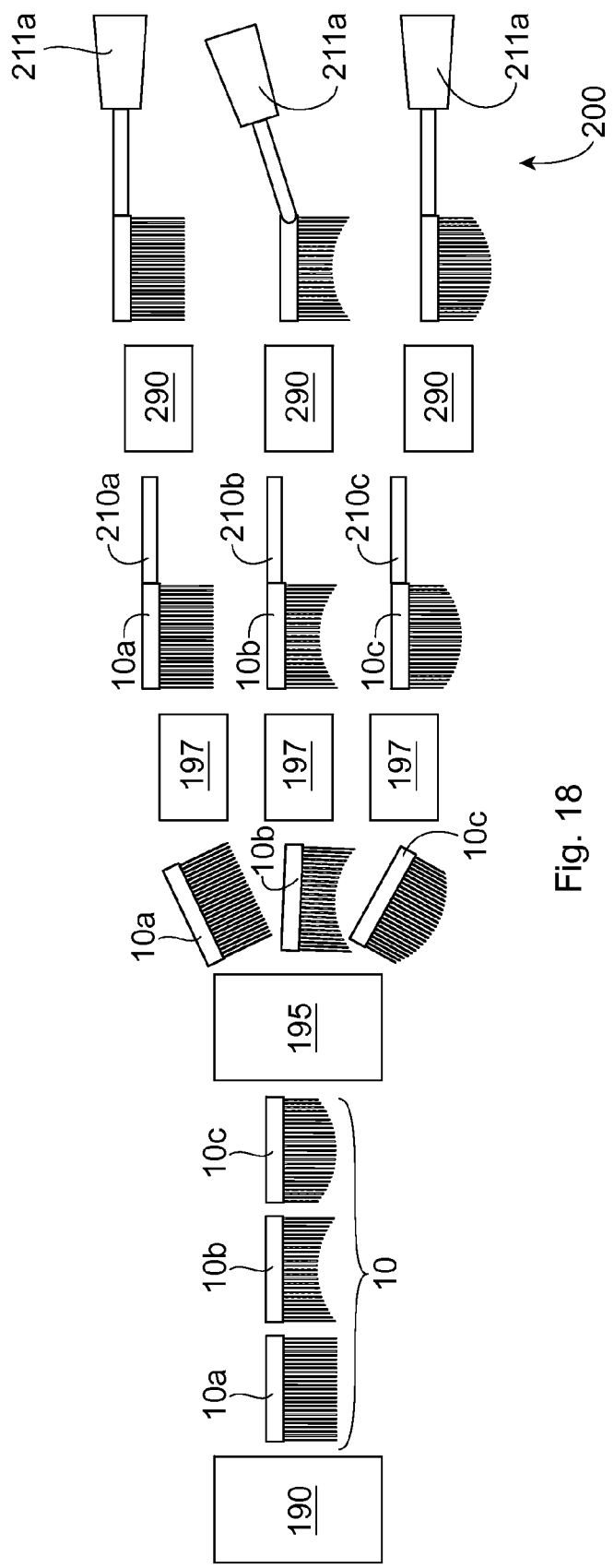
FIG. 18 schematically shows a fragment of an exemplary embodiment of a continuous process for making a cosmetic applicator of the disclosure.

FIG. 18 schematically shows several process steps comprising trimming the bristle components 10 (e.g., at the modifying station 190) to form trimmed bristled components 10a, 10b, 10c; sorting the bristled components (e.g., at a sorting station 195); and attaching the modified and sorted bristle components 10a, 10b, 10c to the stems 210a, 210b, 210c, respectively (e.g., at a stem-applying station 197). Subsequently, a finishing step can be performed (e.g., at a finishing station 290), e.g., to supply the stem with a handle (211a, 211b, 211c), and/or forming a desired angled configuration of the stem, and the like—to form the cosmetic applicator 200.

Figure 19:
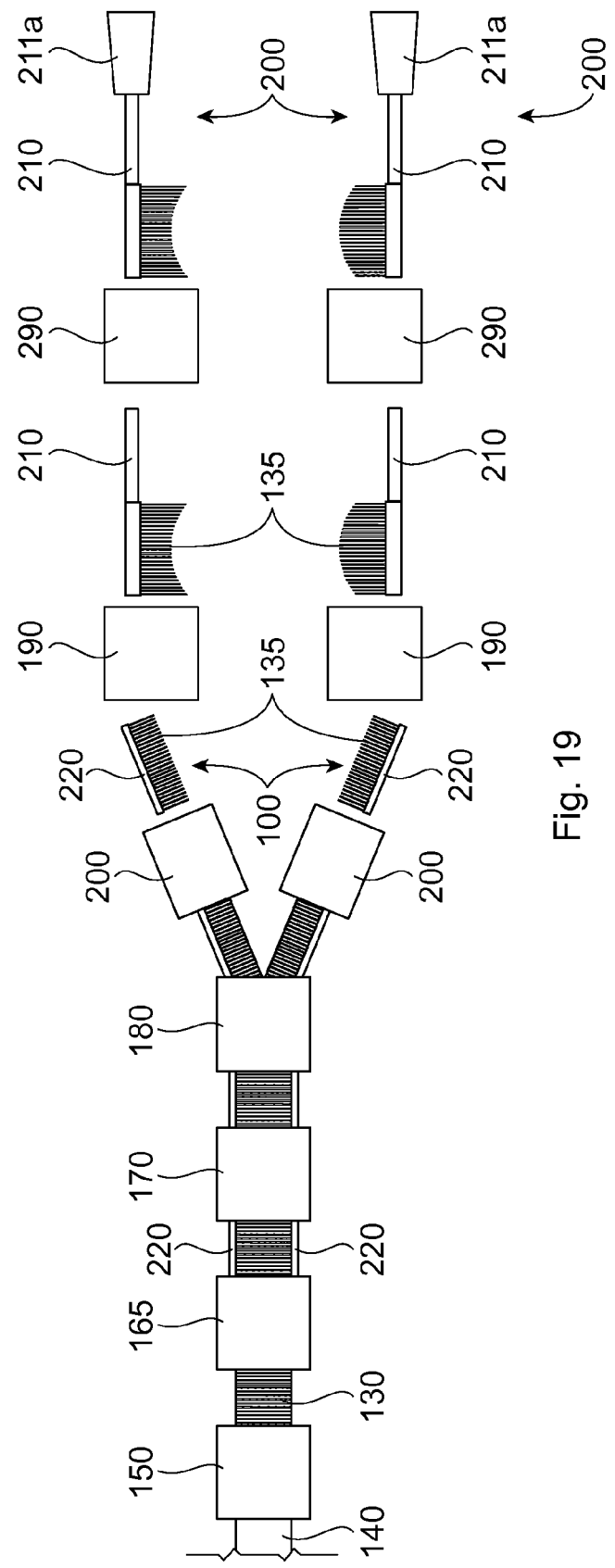
FIG. 19 schematically shows an exemplary embodiment of a continuous process for making a cosmetic applicator of the disclosure.
Figure 20A:
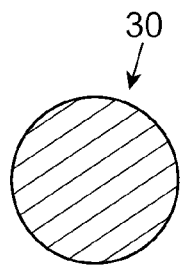
FIG. 20A-20H show exemplary embodiments of cross-sectional shapes of the bristles, including round (FIG. 20A), rectangular (FIG. 20B), triangular (FIG. 20C), polygon (FIG. 20D), elliptical (FIG. 20E), solid (FIGS. 20A-20F), hollow (FIG. 20G), and irregular (FIG. 20H) shapes.
Figure 20B:
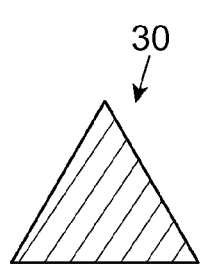
Figure 20C:
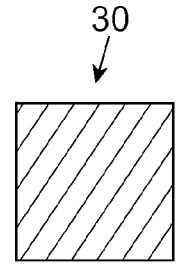
Figure 20D:
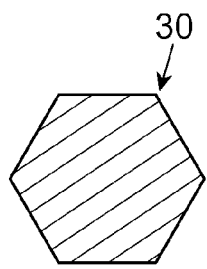
Figure 20E:
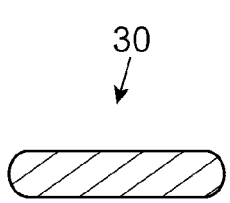
Figure 20F:
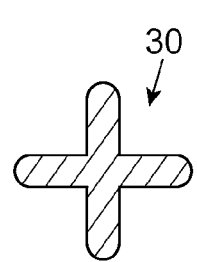
Figure 20G:
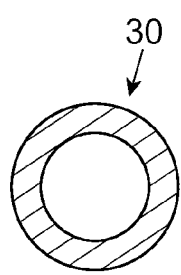
Figure 20H:
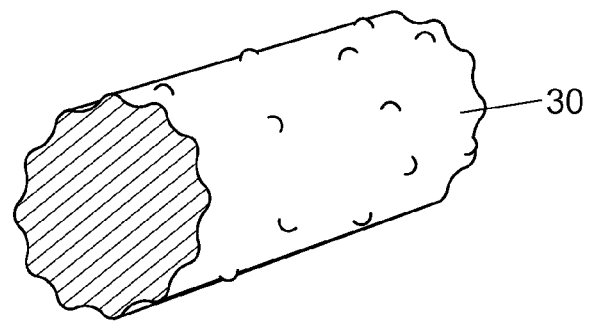
Figure 21:
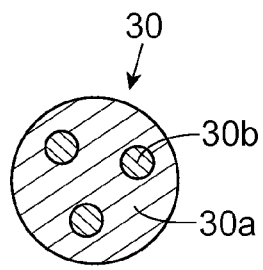
FIG. 21 schematically shows a cross-section of an exemplary embodiment of a composite filament comprising a core and a shell.

In an exemplary embodiment of the process shown in FIG. 19, the support strip 220 has sufficient rigidity to form, after possible modification, the stem 210 of the applicator. The support strip 220 can be applied, similarly to the other embodiments of the process, at the support-strip application station 160. Thereafter, the support strip 220, juxtaposed with the edges of the band 140, can be ultrasonically welded, e.g., at the welding station 170, to the yarn 130. Then, the yarn 130 can be split, e.g., at the splitting station 180, into two continuous bristle strips, which can subsequently be cut, e.g., at the cutting station 200, into individual strips 100 of a desired length, each comprising the support strip 220 and a plurality of yarn filaments 135 ultrasonically welded thereto. These bristle strips 100 can be further modified, e.g., at the modifying station 190, to form a stem 210 out of the support strip 220. This can be done, e.g., by removing a portion of the yarn filaments 135 from the support strip 220. Such partial removal of the yarn filaments 135 from the support strip 220 can be accomplished by any known mechanical or chemical means. In addition, the yarn filaments 135 can be trimmed as well, to form a desired bristle-field profile of the brush being made. Finally, finishing steps can be done, such as, e.g., attaching a handle 211a to the stem 210, and/or strengthening of the stem 210 (not shown).

Figure 22:
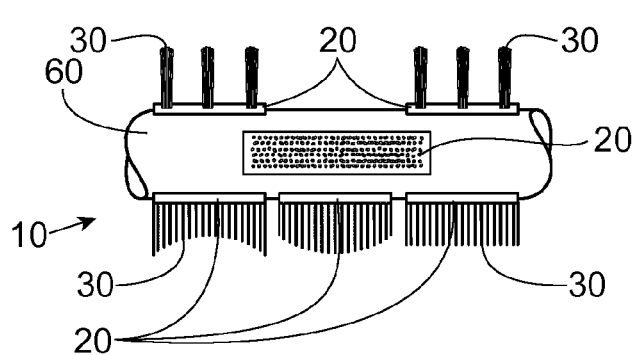
FIG. 22 schematically shows an exemplary embodiment of a bristled component comprising a core and a plurality of longitudinal carriers attached thereto.

One skilled in the art should realize that the depictions of the various embodiments of the process disclosed herein are exemplary embodiments describing principal and optional steps of the process—and various permutations that may not be literally described herein, including different sequences or combinations of the process steps, are contemplated by the present invention. For example, the process may comprise the production of an array or multiplicity of bristled components 10, preferably arranged in parallel rows to one another, affixed to a central core component 11 that is then attached, permanently or removably, to a distal end of an elongated stem 210 having a proximal end including a handle 211a, as schematically shown in an exemplary embodiment of FIGS. 35A-35C. In the embodiment of FIG. 22, a bristled component 10 comprises a core 60 and a plurality of longitudinal bristle carriers 20 attached thereto, each bristle carrier having a plurality of bristles 30 ultrasonically welded to the bristle carrier 20.

Figure 36A:
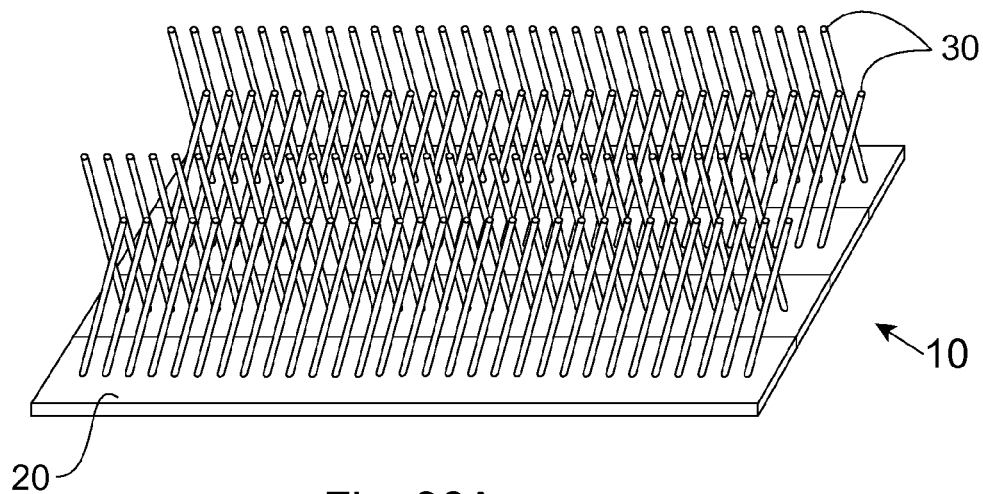
FIGS. 36A-36C schematically show an exemplary embodiment of the bristled component manufactured as comprising an essentially flat support carrier having a plurality of bristles extending therefrom, which carrier can be folded around a core to form a rectangular shape (FIG. 36B) or a round shape (FIG. 36C).
Figure 36B:
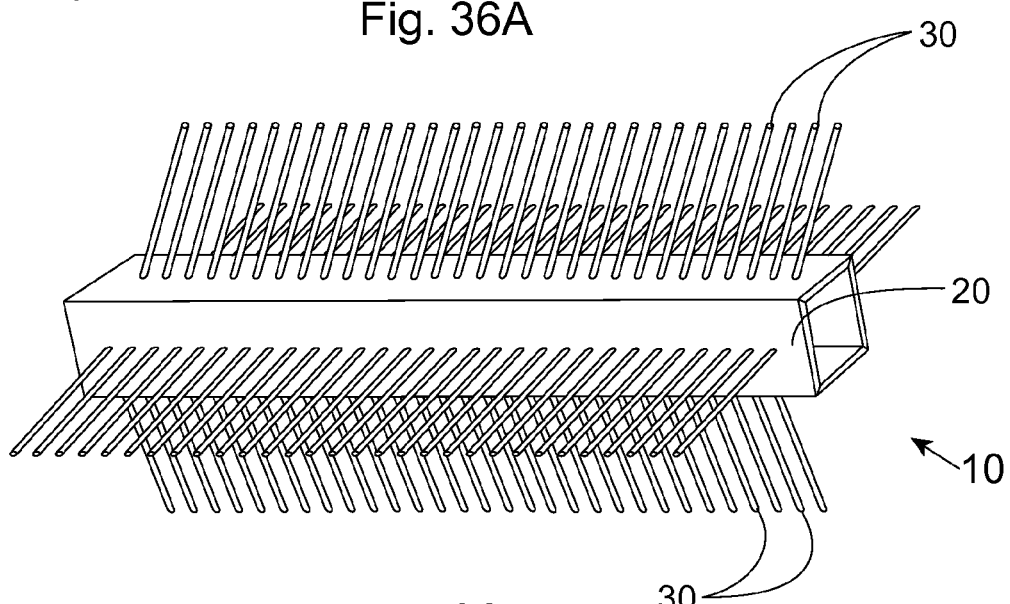
Figure 36C:
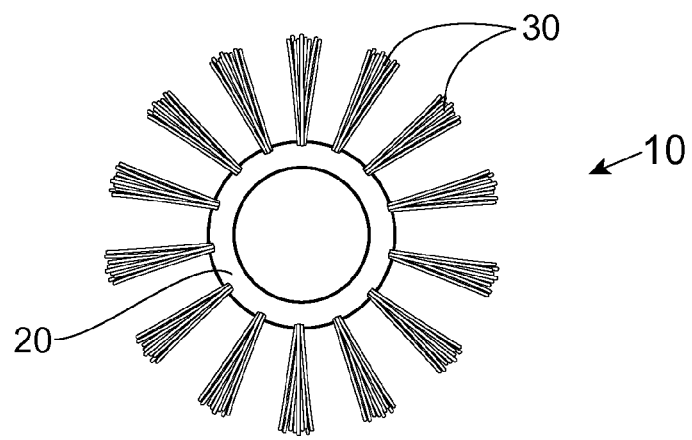

In exemplary embodiments schematically illustrated in FIGS. 36A, 36B, and 36C, the bristled component 10 can be manufactured as comprising an essentially flat support carrier 20 having a plurality of bristles 30 extending therefrom according to a desired pattern (FIG. 36A). Then, this unfolded bristled component 10 can be folded around a core 60 to form any desired cross-sectional shape, e.g., a rectangular shape (FIG. 36B), or a round shape (FIG. 36C).

Figure 37A:
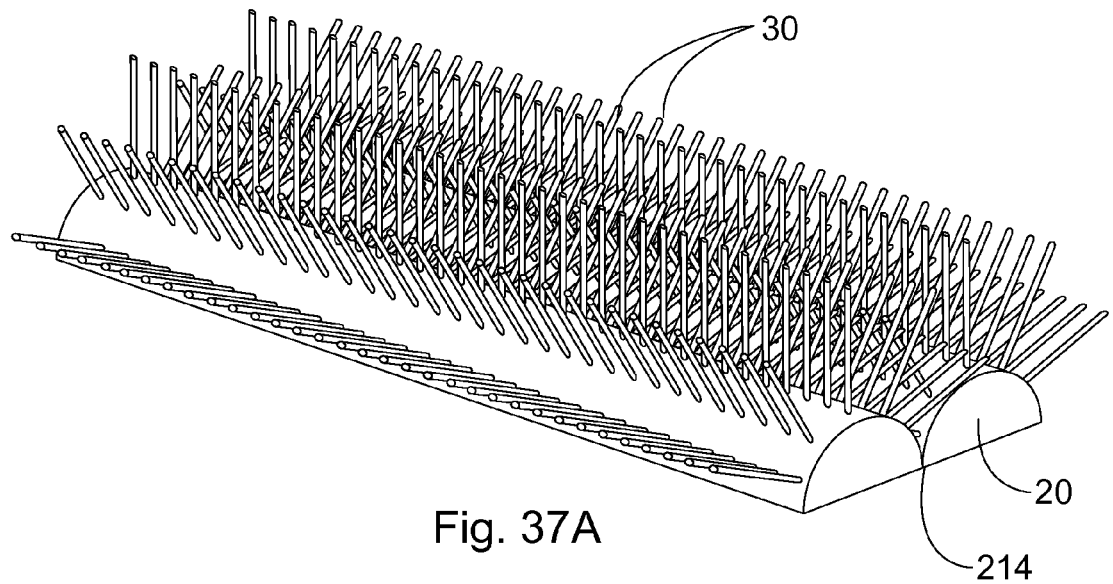
FIGS. 37A and 37B schematically show an exemplary embodiment of the bristled component comprising two semi-cylinders that are "unfolded" in FIG. 37A and folded in FIG. 37B.
Figure 37B:
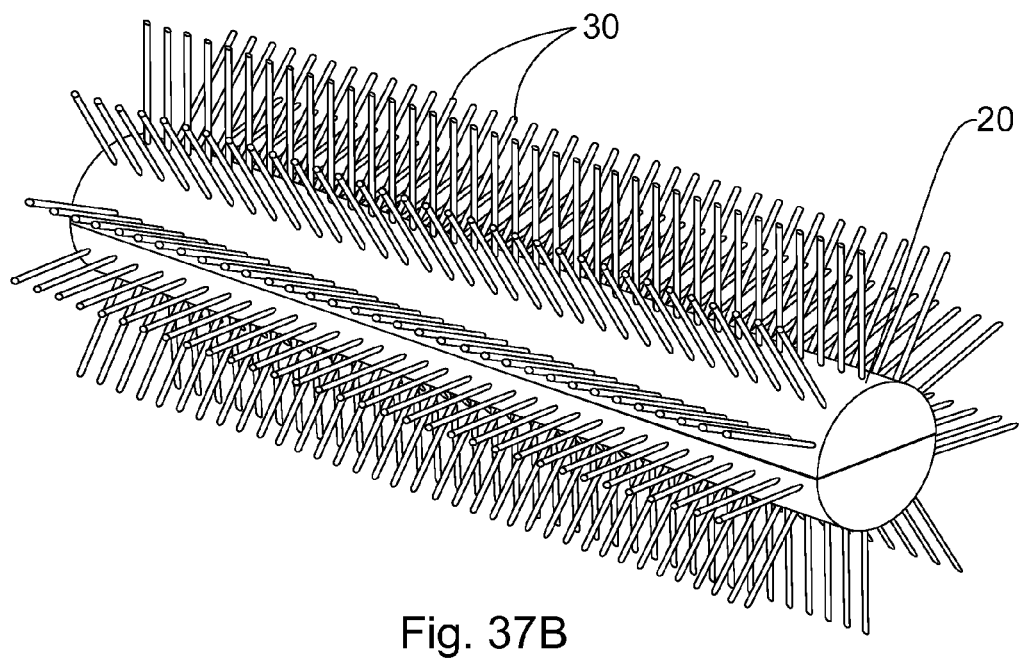
Figure 38A:
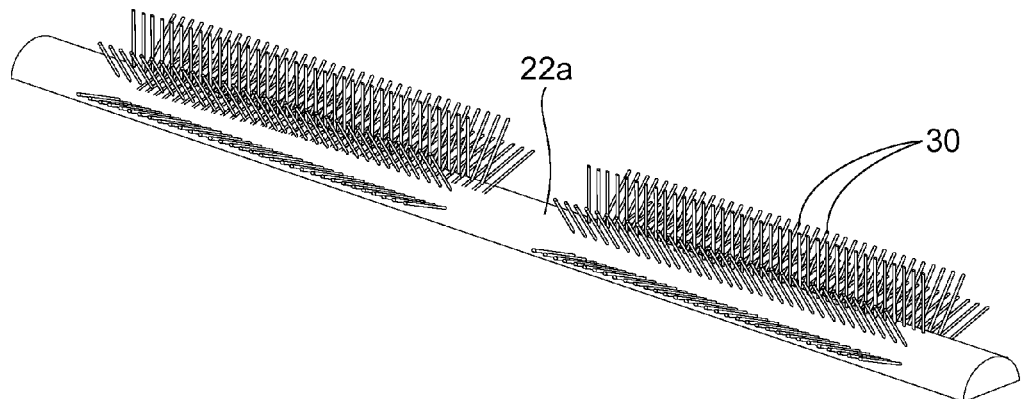
FIGS. 38A-38C schematically show an exemplary embodiment of the bristled component manufactured as a continuous element and thereafter trimmed to form multiple portions of a desired length, which portions can be welded or otherwise joined together.
Figure 38B:
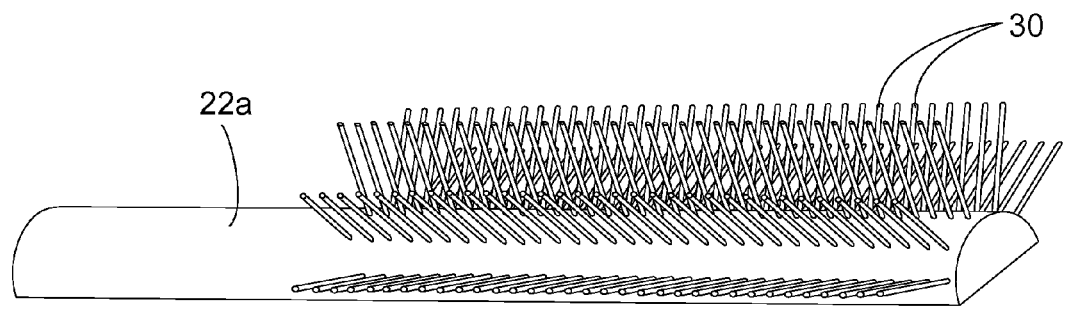
Figure 38C:
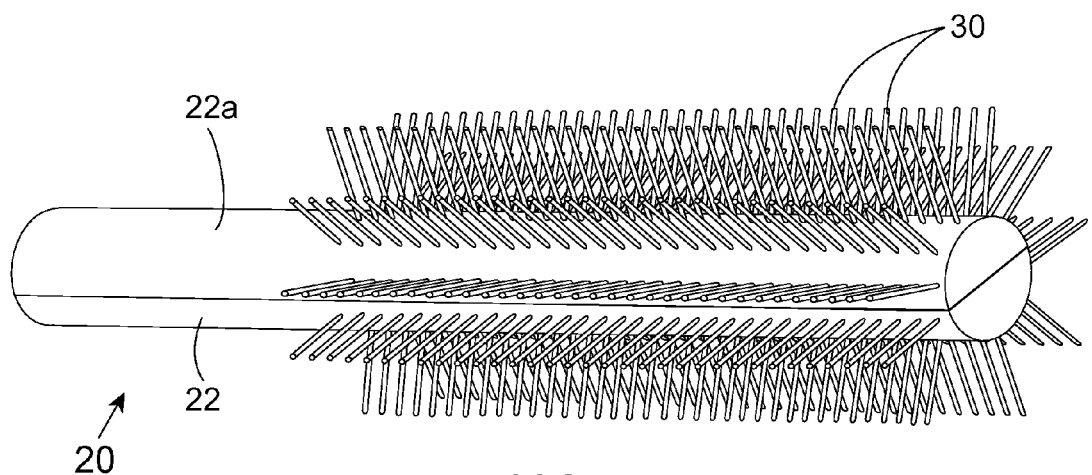

In another exemplary embodiment, schematically illustrated in FIGS. 37A and 37B, the bristled component 10 comprises two semi-cylinders, shown "unfolded" in FIG. 37A. These two semi-cylinders can be united, at their mutually opposing edges, by a living hinge 214 and folded to abut one another, as shown in FIG. 37B. In yet another exemplary embodiment, shown in FIGS. 38A-38C, the bristles 30 can be ultrasonically welded to a continuous carrier element 22 intermittently, FIG. 38A. Then the carrier element 22, having bristles 30 welded thereto, can be trimmed to form multiple portions 22a of a desired length, FIG. 38B. After that, two portions can be welded or otherwise joined together to form the carrier 20 having a plurality of bristles extending therefrom, FIG. 38C.

While particular embodiments have been illustrated and described herein, various other changes and modifications may be made without departing from the spirit and scope of the invention. Moreover, although various aspects of the invention have been described herein, such aspects need not be utilized in combination. It is therefore intended to cover in the appended claims all such changes and modifications that are within the scope of the invention.

The terms "substantially," "essentially," "about," "approximately," and the like, as may be used herein, represent the inherent degree of uncertainty that may be attributed to any quantitative comparison, value, measurement, or other representation. These terms also represent the degree by which a quantitative representation may vary from a stated reference without resulting in a change in the basic function of the subject matter at issue. Further, the dimensions and values disclosed herein are not to be understood as being strictly limited to the exact numerical values recited. Instead, unless otherwise specified, each such dimension is intended to mean both the recited value and a functionally equivalent range surrounding that value. For example, values disclosed as "65%" or "2 mm" are intended to mean "about 65%" or "about 2 mm," respectively.

The disclosure of every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein—or that it alone, or in any combination with any other reference or references, teaches, suggests, or discloses any such invention. Further, to the extent that any meaning or definition of a term in this document conflicts with any meaning or definition of the same or similar term in a document incorporated by reference, the meaning or definition assigned to that term in this document shall govern.

We claim:

1. A continuous process for manufacturing a personal-care applicator, the process comprising:
providing at least a first stem strip having a first longitudinal axis and a second stem strip having a second longitudinal axis;
wrapping at least a first continuous strand of material around a moving endless band having a top side, a backside, and a first edge and a second edge therebetween, thereby causing the first continuous strand of material to abut the first edge and the second edge at a predetermined density;
juxtaposing the first stem strip with the first edge of the band having the first continuous strand of material in contact with the first edge, the first continuous strand of material and the first stem strip comprising ultrasonically compatible materials;
juxtaposing the second stem strip with the second edge of the band, the second edge being opposite to the first edge;
ultrasonically welding lengthwise portions of the first continuous strand of material adjacent to the first edge to the first stem strip at the predetermined density and such that said lengthwise portions of the first continuous strand of material become ultrasonically bonded to the first stem strip through a direct ultrasonic bond between a surface of the first stem strip and surfaces of said lengthwise portions of the first continuous strand of material, thereby forming a plurality of first-strand bristles ultrasonically welded to the first stem strip;
removing the first stem strip having the plurality of first-strand bristles ultrasonically welded thereto from the endless band; and
cutting the first stem strip having the plurality of first-strand bristles ultrasonically welded thereto into a plurality of applicator components, each comprising a stem having a proximal end, a distal end opposite to the proximal end, and an array of bristles ultrasonically welded to the stem between the proximal and distal ends.

2. The process of claim 1, wherein providing at least a first stem strip comprises manufacturing the stem strip from a plastic material using a technique selected from the group consisting of molding, stamping, 3D-printing, milling, extrusion, pultrusion, and any combination thereof.

3. The process of claim 1, wherein the process comprises splitting the at least first continuous strand of material to form a plurality of free ends thereof.

4. The process of claim 1, wherein the process comprises modifying at least one physical characteristic of the plurality of first-strand bristles or the array of bristles.

5. The process of claim 4, wherein modifying the at least one physical characteristic comprises subjecting the at least some of the plurality of the first-strand bristles or the array of bristles to a treatment selected from the group consisting of trimming, coating, mechanical treatment, temperature treatment, chemical treatment, radiation treatment, modification of surface energy, change of shape, change of color, and change of angular orientation.

6. The process of claim 1, wherein the process comprises modifying the at least first stem strip or the stem of the applicator component.

7. The process of claim 6, wherein modifying comprises subjecting the at least first stem strip or the stem of the applicator component to a treatment selected from the group consisting of trimming, coating, mechanical treatment, temperature treatment, chemical treatment, radiation treatment, modification of surface energy, change of shape, and change of color.

8. The process of claim 1, wherein the step of wrapping a continuous strand of material around a moving endless band is conducted at the predetermined density that varies.

9. The process of claim 1, wherein wrapping at least a first continuous strand of material around a moving endless band comprises wrapping at least a second continuous strand of material around the moving endless band.

10. The process of claim 9, wherein the at least first continuous strand of material differs from the at least second continuous strand of material in at least one physical characteristic selected from the group consisting of material, thickness, elasticity, rigidity, cross-sectional shape, surface energy, and color.

11. The process of claim 9, wherein wrapping at least a first continuous strand of material around a moving endless band comprises wrapping the first continuous strand of material around the band at a first density and wrapping the second continuous strand of material around the band at a second density, the first density being different from the second density.

12. The process of claim 9, wherein the first continuous strand of material and the second continuous strand of material mutually alternate at the at least first edge of the band.

13. The process of claim 1, wherein wrapping at least a first continuous strand of material around a moving endless band comprises causing the first continuous strand of material to form a pattern wherein portions of the first continuous strand of material disposed on the top side of the band form acute angles relative to a direction in which the band is traveling.

14. The process of claim 9, wherein wrapping at least a first continuous strand of material around a moving endless band comprises causing the first continuous strand of material to comprise a pattern wherein portions of the first continuous strand of material disposed on the top side of the band form a first angle relative to a direction in which the band is traveling, and causing the second continuous strand of material to comprise a pattern wherein portions of the second continuous strand of material disposed on the top side of the band form a second angle relative to the direction in which the band is traveling, and wherein the first angle is different from the second angle.

15. The process of claim 1, wherein juxtaposing at least a first stem strip with the at least first edge of the band comprises juxtaposing the first stem strip that has a cross-sectional shape selected from the group consisting of round, rectangular, triangular, polygon, elliptical, substantially flat, solid, hollow, and irregular shapes, and any combination thereof.

16. The process of claim 1, wherein juxtaposing at least a first stem strip with the at least first edge of the band comprises juxtaposing the first stem strip that has a longitudinal slot configured to receive the first edge therein.

17. The process of claim 16, wherein the longitudinal slot is generally V-shaped as viewed in the cross-section perpendicular to the longitudinal axis of the stem strip, the slot having a first inner surface and a second inner surface angled relative to the first inner surface, the first and second inner surfaces forming therebetween an angle from about 1 degree to about 179 degrees.

18. The process of claim 17, wherein the angle between the first and second inner surfaces is from about 5 degrees to about 90 degrees.

19. The process of claim 17, wherein the first inner surface is wider than the second inner surface.

20. The process of claim 1, wherein the process comprises twisting the stem around its longitudinal axis thereby causing the bristles ultrasonically welded to the stem between the proximal and distal ends thereof to change their position relative to one another acquired during ultrasonic welding.

21. The process of claim 1, wherein the process comprises twisting the stem around its longitudinal axis thereby causing the array of bristles ultrasonically welded to the stem between the proximal and distal ends thereof to form a shape comprising a substantially helical coil spiraling around the stem.

22. The process of claim 1, wherein the process comprises attaching a handle to the stem.

23. A continuous process for manufacturing a personal-care applicator, the process comprising:
providing at least a first stem strip having a longitudinal axis and a cross-sectional shape selected from the group consisting of round, rectangular, triangular, polygon, elliptical, substantially flat, solid, hollow, and irregular shapes, and any combination thereof;
wrapping at least a first continuous strand of material around a moving endless band having a top side, a backside, and at least a first edge therebetween, thereby causing the first continuous strand of material to abut the first edge at a predetermined density;
juxtaposing the first stem strip with the first edge of the band having the first continuous strand of material in contact with the first edge, the first continuous strand of material and the first stem strip comprising ultrasonically compatible materials;
ultrasonically welding lengthwise portions of the first continuous strand of material adjacent to the first edge to the first stem strip at the predetermined density and such that said lengthwise portions of the first continuous strand of material become ultrasonically bonded to the first stem strip through a direct ultrasonic bond between a surface of the first stem strip and surfaces of said lengthwise portions of the first continuous strand of material, thereby forming a plurality of first-strand bristles ultrasonically welded to the first stem strip;
removing the first stem strip having the plurality of first-strand bristles ultrasonically welded thereto from the endless band; and
cutting the first stem strip having the plurality of first-strand bristles ultrasonically welded thereto into a plurality of applicator components, each comprising a stem having a proximal end, a distal end opposite to the proximal end, and an array of bristles ultrasonically welded to the stem between the proximal and distal ends.

24. A continuous process for manufacturing a personal-care applicator, the process comprising:
providing at least a first stem strip having a longitudinal axis;
wrapping at least a first continuous strand of material around a moving endless band having a top side, a backside, and at least a first edge therebetween, thereby causing the first continuous strand of material to abut the first edge at a predetermined density;
juxtaposing the first stem strip with the first edge of the band having the first continuous strand of material in contact with the first edge, the first continuous strand of material and the first stem strip comprising ultrasonically compatible materials, wherein the first stem strip has a longitudinal slot configured to receive the first edge therein;
ultrasonically welding lengthwise portions of the first continuous strand of material adjacent to the first edge to the first stem strip at the predetermined density and such that said lengthwise portions of the first continuous strand of material become ultrasonically bonded to the first stem strip through a direct ultrasonic bond between a surface of the first stem strip and surfaces of said lengthwise portions of the first continuous strand of material, thereby forming a plurality of first-strand bristles ultrasonically welded to the first stem strip;

removing the first stem strip having the plurality of first-strand bristles ultrasonically welded thereto from the endless band; and cutting the first stem strip having the plurality of first-strand bristles ultrasonically welded thereto into a plurality of applicator components, each comprising a stem having a proximal end, a distal end opposite to the proximal end, and an array of bristles ultrasonically welded to the stem between the proximal and distal ends.

* * * * *